United States Patent
Itou et al.

(10) Patent No.: US 9,761,890 B2
(45) Date of Patent: Sep. 12, 2017

(54) REDOX FLOW BATTERY WITH ANISOTROPIC ELECTRODE LAYER

(71) Applicant: Sumitomo Electric Industries, Ltd., Osaka-shi (JP)

(72) Inventors: Kenichi Itou, Osaka (JP); Kei Hanafusa, Osaka (JP); Souichirou Okumura, Osaka (JP); Takemi Terao, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 15/113,376

(22) PCT Filed: Dec. 9, 2014

(86) PCT No.: PCT/JP2014/082498
§ 371 (c)(1),
(2) Date: Jul. 21, 2016

(87) PCT Pub. No.: WO2015/111313
PCT Pub. Date: Jul. 30, 2015

(65) Prior Publication Data
US 2017/0012299 A1    Jan. 12, 2017

(30) Foreign Application Priority Data
Jan. 24, 2014    (JP) ................. 2014-011897

(51) Int. Cl.
*H01M 2/38*    (2006.01)
*H01M 8/0263*    (2016.01)
(Continued)

(52) U.S. Cl.
CPC ....... *H01M 8/0263* (2013.01); *H01M 4/8626* (2013.01); *H01M 8/188* (2013.01); *H01M 8/20* (2013.01); *Y02E 60/528* (2013.01)

(58) Field of Classification Search
CPC .... H01M 8/0263; H01M 4/8626; H01M 8/20; H01M 8/188
See application file for complete search history.

(56) References Cited

U.S. PATENT DOCUMENTS

2012/0244395 A1* 9/2012 Perry ................. H01M 8/0265
429/51
2012/0258345 A1* 10/2012 Zaffou ................ H01M 4/8605
429/105
(Continued)

FOREIGN PATENT DOCUMENTS

EP    0 727 837 A1    8/1996
JP    63-8568 U    1/1988
(Continued)

OTHER PUBLICATIONS

International Search Report in International Application No. PCT/JP2014/082498, dated Mar. 17, 2015.
(Continued)

*Primary Examiner* — Gary Harris
(74) *Attorney, Agent, or Firm* — Venable LLP; Michael A. Sartori; Laura G. Remus

(57) ABSTRACT

A redox flow battery having reduced internal resistance is provided. The redox flow battery includes a membrane, a bipolar plate, an electrode disposed between the membrane and the bipolar plate, an inlet port for supplying an electrolyte to the electrode, and an outlet port for discharging the electrolyte from the electrode, and performs a charge-discharge reaction by allowing the electrolyte to flow in the electrode. The electrode includes an anisotropic electrode layer having different permeabilities between a direction A1 on a plane of the electrode and a direction A2 orthogonal to the direction A1 on the plane of the electrode. In the anisotropic electrode layer, a permeability K1 in the direction A1 is larger than a permeability K2 in the direction A2. The electrode is disposed such that the direction A1 is substantially parallel to a main flow direction of the electrolyte in the electrode, the main flow direction being determined on the basis of a positional relationship between the inlet port and the outlet port and a shape of a surface of the bipolar plate on the electrode side.

7 Claims, 15 Drawing Sheets

(51) Int. Cl.
*H01M 8/18* (2006.01)
*H01M 8/20* (2006.01)
*H01M 4/86* (2006.01)

(56) References Cited

U.S. PATENT DOCUMENTS

2013/0115504 A1* 5/2013 Lee .................. B01J 41/00
 429/101
2013/0252041 A1 9/2013 Fujimoto et al.

FOREIGN PATENT DOCUMENTS

| JP | H02-148659 A | 6/1990 |
| JP | 2002-367659 A | 12/2002 |
| WO | WO-2011/075135 A1 | 6/2011 |
| WO | 2012/142143 A1 | 10/2012 |
| WO | WO-2013/095378 A1 | 6/2013 |

OTHER PUBLICATIONS

Extended European Search Report in counterpart European Patent Application No. 14879731.9 dated Dec. 16, 2016.

* cited by examiner

131: 131a, 131b
132: 132a, 132b
130: 131, 132

131: 131a, 131b
132: 132a, 132b
130: 131, 132

REDOX FLOW BATTERY WITH ANISOTROPIC ELECTRODE LAYER

TECHNICAL FIELD

The present invention relates to a redox flow battery. In particular, the present invention relates to an electrolyte flow-type redox flow battery having reduced internal resistance.

BACKGROUND ART

Redox flow batteries (hereinafter referred to as "RF batteries") are batteries that perform charging and discharging using the difference in oxidation-reduction potential between ions contained in a positive electrode electrolyte and ions contained in a negative electrode electrolyte. As illustrated in FIG. 23, an RF battery 1 includes a battery cell 100 that is separated into a positive electrode cell 102 and a negative electrode cell 103 by a membrane 101 that allows hydrogen ions (protons) to permeate. The positive electrode cell 102 contains a positive electrode 104 and is connected via ducts 108 and 110 to a positive electrode electrolyte tank 106 that stores a positive electrode electrolyte. Similarly, the negative electrode cell 103 contains a negative electrode 105 and is connected via ducts 109 and 111 to a negative electrode electrolyte tank 107 that stores a negative electrode electrolyte. The electrolytes stored in the tanks 106 and 107 are circulated within the electrode cells 102 and 103 by pumps 112 and 113, respectively, during charging and discharging.

As illustrated in the lower drawing of FIG. 24, the battery cell 100 is usually formed inside a structure referred to as a cell stack 200. As illustrated in the upper drawing of FIG. 24, the cell stack 200 has a structure in which a cell frame 120 including a bipolar plate 121 integrated into a frame 122 shaped like a picture frame, a positive electrode 104, a membrane 101, and a negative electrode 105 are stacked in that order. In this structure, a battery cell 100 is formed between the bipolar plates 121 of the adjacent cell frames 120.

In the cell stack 200, the flow of the electrolytes through the battery cell 100 is performed by using liquid supply manifolds 123 and 124 and liquid discharge manifolds 125 and 126 which are provided on the frame 122. The positive electrode electrolyte is supplied from the liquid supply manifold 123 through a groove formed on one surface side (front side of the sheet) of the frame 122 to the positive electrode 104 disposed on the one surface side of the bipolar plate 121. The positive electrode electrolyte is discharged through a groove formed on the upper part of the frame 122 to the liquid discharge manifold 125. Similarly, the negative electrode electrolyte is supplied from the liquid supply manifold 124 through a groove formed on the other surface side (back side of the sheet) of the frame 122 to the negative electrode 105 disposed on the other surface side of the bipolar plate 121. The negative electrode electrolyte is discharged through a groove formed on the upper part of the frame 122 to the liquid discharge manifold 126.

Each of the electrodes 104 and 105 that form the battery cell 100 is often formed of a porous conductive material so that a flow of an electrolyte which is a fluid does not block a flow of the electrolyte flowing from the liquid-supply side to the liquid-discharge side. For example, a carbon felt or the like is used (for example, PTL 1).

CITATION LIST

Patent Literature

PTL 1: Japanese Unexamined Patent Application Publication No. 2002-367659

SUMMARY OF INVENTION

Technical Problem

A charge-discharge reaction of an RF battery is performed by allowing an electrolyte to flow through an electrode formed of a carbon felt or the like. In such a case, a flow state of the electrolyte, for example, uniformity of the flow of the electrolyte through the electrode affects the internal resistance of the RF battery. However, in existing RF batteries, there have not necessarily been a sufficient number of studies conducted on the reduction in the internal resistance with adequate consideration of the flow state of an electrolyte through an electrode.

Accordingly, an object of the present invention is to provide a redox flow battery having reduced internal resistance.

Solution to Problem

A redox flow battery according to the present invention includes a membrane, a bipolar plate, an electrode disposed between the membrane and the bipolar plate, an inlet port for supplying an electrolyte to the electrode, and an outlet port for discharging the electrolyte from the electrode, and performs a charge-discharge reaction by allowing the electrolyte to flow in the electrode. The electrode includes an anisotropic electrode layer having different permeabilities between a direction A1 on a plane of the electrode and a direction A2 orthogonal to the direction A1 on the plane of the electrode. In the anisotropic electrode layer, a permeability K1 in the direction A1 is larger than a permeability K2 in the direction A2. The electrode is disposed such that the direction A1 is substantially parallel to a main flow direction of the electrolyte in the electrode, the main flow direction being determined on the basis of a positional relationship between the inlet port and the outlet port and a shape of a surface of the bipolar plate on the electrode side.

Advantageous Effects of Invention

According to the RF battery of the present invention, an RF battery having reduced internal resistance can be provided.

DESCRIPTION OF EMBODIMENTS

Figure 1:
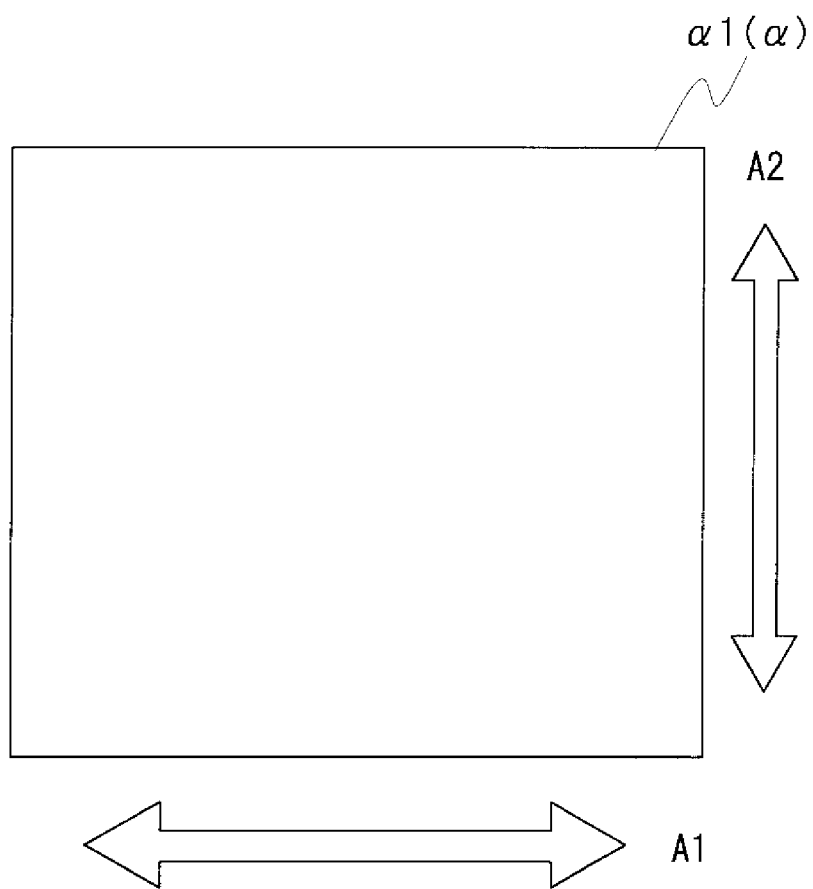
FIG. 1 is a schematic side view illustrating an embodiment of an electrode included in an RF battery according to Embodiment 1.

Description of Embodiments of the Present Invention

The inventors of the present invention conducted various studies in order to reduce the internal resistance of an RF battery. During the studies, it was found that although a plurality of RF batteries having the same structure were operated under the same conditions, there were RF batteries having high internal resistances and RF batteries having low internal resistances. The inventors of the present invention conducted further studies on these RF batteries having different internal resistances and found the following.

(A) In some electrodes, flowability (permeability) of an electrolyte varies depending on a direction in which the electrolyte is allowed to flow (such electrodes are hereinafter referred to as "anisotropic electrodes").

(B) An RF battery in which a specific direction of such an anisotropic electrode is aligned with a main flow direction (details of which will be described later) of an electrolyte in the electrode can have an internal resistance lower than that of an RF battery that does not have this structure.

The present invention has been made on the basis of these findings. The contents of embodiments of the present invention will be listed and described below.

(1) An RF battery according to an embodiment includes a membrane, a bipolar plate, an electrode disposed between the membrane and the bipolar plate, an inlet port for supplying an electrolyte to the electrode, and an outlet port for discharging the electrolyte from the electrode, and performs a charge-discharge reaction by allowing the electrolyte to flow in the electrode. The electrode includes an anisotropic electrode layer having different permeabilities between a direction A1 on a plane of the electrode and a direction A2 orthogonal to the direction A1 on the plane of the electrode. In the anisotropic electrode layer, a permeability K1 in the direction A1 is larger than a permeability K2 in the direction A2. The electrode is disposed such that the direction A1 is substantially parallel to a main flow direction of the electrolyte in the electrode, the main flow direction being determined on the basis of a positional relationship between the inlet port and the outlet port and a shape of a surface of the bipolar plate on the electrode side.

In an RF battery, a main flow direction of an electrolyte in an electrode is present. The electrolyte flowing in the main flow direction is mainly involved in a charge-discharge reaction (hereinafter may be referred to as "battery reaction"). Since the RF battery of this embodiment has the above structure, it is easy to increase a portion where the electrolyte flows in the electrode in the main flow direction at a flow velocity suitable for the operation of the RF battery and to decrease a portion where the electrolyte flowing in the main flow direction is stagnant in the electrode. Accordingly, a variation in the flow velocity in the electrode in the main flow direction is easily decreased. Thus, since the battery reaction is easily performed uniformly in a wide range of the electrode, an RF battery having a reduced internal resistance can be provided.

(2) In the RF battery according to an embodiment, the permeability K1 is 1.5 times or more and 100 times or less the permeability K2.

When the permeability K1 is 1.5 times or more the permeability K2, anisotropy of the anisotropic electrode layer is significant, and it is easy to increase a portion where the electrolyte flows in the electrode in the main flow direction at a flow velocity suitable for the operation of the RF battery compared with the case where an electrode that does not have anisotropy (hereinafter referred to as "isotropic electrode") is used. When the permeability K1 is 100 times or less the permeability K2, it is easy to decrease a portion where the electrolyte flowing in the main flow direction is stagnant in the electrode. Consequently, according to the RF battery of this embodiment, since the battery reaction is easily performed uniformly in a wide range of the electrode, an RF battery having further reduced internal resistance can be provided. Furthermore, when the permeability K1 is 1.5 times or more and 100 times or less the permeability K2, the electrolyte is easily introduced on the electrode and thus it is expected that a pressure loss of the electrolyte can be reduced.

(3) In the RF battery according to an embodiment, the bipolar plate includes a flow channel which is disposed on the surface on the electrode side and in which the electrolyte flows. The flow channel has a plurality of groove portions disposed parallel to each other. The main flow direction is a direction in which the groove portions are disposed in parallel.

When the bipolar plate includes a flow channel having a plurality of groove portions disposed parallel to each other, the electrolyte can be easily supplied to a wide range of the plane of the electrode along the flow channel at a low pressure loss. In addition, a flow of the electrolyte in the main flow direction through the electrode is easily generated between the groove portions disposed parallel to each other. Accordingly, it is expected that the battery reaction is sufficiently performed in the electrode. Thus, it is expected that the amount of a reaction current is easily increased, and furthermore, the internal resistance can be further reduced. Accordingly, the RF battery of this embodiment has a good energy efficiency as a whole RF battery.

(4) In the RF battery according to the embodiment of (3) above, the flow channel includes an inlet channel connected to the inlet port and an outlet channel connected to the outlet port. The inlet channel and the outlet channel each include the groove portions. The inlet channel and the outlet channel do not communicate with each other and are independent of each other.

When the inlet channel and the outlet channel do not communicate with each other and are independent of each other, the electrolyte that passes directly from the inlet port to the outlet port without being substantially involved in the battery reaction is decreased, and a flow of the electrolyte is easily generated between the inlet channel and the outlet channel through the electrode. Therefore, since the amount of electrolyte flowing in the electrode in the main flow direction is easily increased and the amount of a reaction current is easily increased, it is expected that the internal resistance is reduced. Accordingly, the RF battery of this embodiment has a good energy efficiency as a whole RF battery.

(5) In the RF battery according to the embodiment of (4) above, the inlet channel and the outlet channel each include groove portions having a comb-teeth shape, and the inlet channel and the outlet channel are disposed such that comb teeth face each other in an interdigitated manner.

When the flow channel includes comb teeth disposed so as to face each other in an interdigitated manner, a flow of the electrolyte through the electrode in the main flow direction is easily generated between the inlet channel and the outlet channel, in particular, between adjacent comb teeth. In addition, the electrolyte is easily spread evenly over a wide range of the electrode under some conditions of the number of the comb teeth and the region where the comb teeth are formed. Therefore, the electrolyte is introduced from a wide range region of the electrode into the electrode, and it is expected that a uniform battery reaction is performed. Therefore, the amount of a reaction current is easily increased, and furthermore, it is expected that the internal resistance can be reduced. Accordingly, the RF battery of this embodiment has a good energy efficiency as a whole RF battery.

(6) In the RF battery according to the embodiment of (3) above, the flow channel has a continuous meandering shape extending from the inlet port to the outlet port and includes a plurality of long groove portions disposed in parallel so as to be adjacent to each other, and a plurality of short groove portions that alternately connect one ends or the other ends of the long groove portions to each other. The main flow direction is a direction in which the long groove portions are disposed in parallel.

When the flow channel is continuous from the inlet port to the outlet port, the flow of the electrolyte flowing in the flow channel becomes smooth, and a pressure loss of the electrolyte can be reduced. When the flow channel has a meandering shape while being such a continuous flow channel, a flow of the electrolyte through the electrode is easily generated between the adjacent long groove portions. The electrolyte is easily spread evenly over a wide range of the electrode under some conditions of the number of the long groove portions and the region where the long groove portions are formed. Therefore, the electrolyte is introduced from a wide range region of the electrode into the electrode, and it is expected that a uniform battery reaction is performed. Accordingly, the RF battery of this embodiment has a good energy efficiency as a whole.

(7) In the RF battery according to the embodiment of (1) or (2) above, the shape of the surface of the bipolar plate on the electrode side is a flat surface shape. The main flow direction is directed from the inlet port side to the outlet port side.

Even when the surface of the bipolar plate on the electrode side is a flat surface that does not have a groove portion, by disposing the direction A1 so to be substantially parallel to the main flow direction, the variation in the flow velocity in the main flow direction is easily reduced as compared with an RF battery including an anisotropic electrode layer that does not satisfy this relationship between the directions and an RF battery including an isotropic electrode. Consequently, the battery reaction is easily performed uniformly in a wide range of the electrode, and an RF battery having a reduced internal resistance can be provided.

Detailed Description of Embodiments of the Present Invention

RF batteries according to embodiments will now be described with reference to the drawings. In the drawings, the same reference characters denote components having the same name. It is intended that the present invention is not limited to the embodiments, but is determined by appended claims, and includes all variations of the equivalent meanings and ranges to the claims.

Embodiment 1

(Outline of RF Battery)

In Embodiment 1, a description will be made of an RF battery which includes an anisotropic electrode having flowability of an electrolyte, the flowability being different between a longitudinal direction and a lateral direction on a plane of the electrode, and in which the anisotropic electrode is disposed such that a direction in which an electrolyte easily flows is parallel to a main flow direction of the electrolyte. The "main flow direction", which will be described in detail later, is typically an upward direction on a plane of each electrode cell. However, when a plurality of groove portions are disposed in parallel on a bipolar plate, the main flow direction is a direction in which the groove portions are disposed in parallel, for example, the left-right direction (width direction). This RF battery has a basic structure common to the existing RF battery that has been described with reference to FIGS. 23 and 24. Therefore, an electrode and a bipolar plate that relate to the difference will be mainly described below. Points relating to the basic structure will be described with reference to FIGS. 23 and 24.

(Electrode)

The electrode is a conductive member for performing a battery reaction as a result of a flow of an electrolyte. In order to ensure a sufficient contact area with the electrolyte, a porous material is usually used. An anisotropic electrode α used as each of the electrodes 104 and 105 that are included in an RF battery of the present embodiment will be described with reference to FIG. 1. In FIG. 1, the left-right direction of the drawing is defined as a width, the top-bottom direction of the drawing is defined as a height, and a direction from the front toward the back of the drawing is defined as a thickness. The anisotropic electrode α includes an anisotropic electrode layer α1 having different permeabilities between two directions orthogonal to each other on a plane of the electrode. FIG. 1 illustrates an anisotropic electrode α having a single-layer structure and including only the anisotropic electrode layer α1.

The anisotropy of the electrode is determined as follows. Permeabilities K of an electrode in two directions orthogonal to each other are measured. A direction that exhibits a high permeability K1 is defined as an A1 direction, and a direction that exhibits a low permeability K2 is defined as an A2 direction. The permeabilities K are preferably measured for a plurality of pairs of directions including a plurality of directions and directions orthogonal to these corresponding directions. This is because the degree of anisotropy may be different in some directions in which the permeability is measured. In such a case, a direction that exhibits the highest permeability is defined as the A1 direction, and a direction orthogonal to this direction is defined as the A2 direction. It is believed that this method for determining anisotropy is particularly effective in a case of a circular electrode, or the like. In a case of a rectangular electrode, usually, one of the height direction and the width direction is the A1 direction, and the other direction is the A2 direction.

When the electrode cells 102 and 103 (that form the cell stack 200) are assembled using the anisotropic electrode α, the anisotropic electrode α is disposed such that the A1 direction that exhibits a high permeability is disposed parallel to the main flow direction of the electrolyte. Therefore, when the main flow direction is, for example, the width direction of each of the electrode cells 102 and 103, the anisotropic electrode α is cut out in advance such that the width direction of the rectangular anisotropic electrode α is the A1 direction that exhibits a high permeability, and the height direction of the rectangular anisotropic electrode α is the A2 direction that exhibits a low permeability. In this embodiment, the width direction is the A1 direction, and the permeability K1 in the A1 direction is larger than the permeability K2 in the height direction A2.

Specific examples of the anisotropic electrode layer include carbon felts, carbon paper, and carbon cloths. Some of these materials are originally provided with anisotropy. Some of these materials are provided with anisotropy by, for example, heat-treating an isotropic material. An example of the materials that are originally provided with anisotropy is a carbon cloth in which the fiber diameter of the warp and the fiber diameter of the weft are different from each other. An anisotropic electrode layer may be obtained by performing heat treatment on an isotropic electrode layer. Anisotropy may become more significant by performing, for example, heat treatment on an anisotropic electrode layer. When anisotropy is provided or anisotropy is made significant by performing heat treatment, the degree of anisotropy can be adjusted by adjusting the heat treatment conditions. Preferred heat treatment conditions are, for example, conditions in an air atmosphere at 200° C. or more and 1,000° C. or less for 5 minutes or more and 120 minutes or less. Such heat treatment can provide an electrode having particular permeability K1 and permeability K2 in two directions orthogonal to each other. Examples of the heat treatment conditions include conditions in an air atmosphere at 300° C. or more and 800° C. or less for 20 minutes or more and 100 minutes or less and conditions in an air atmosphere at 400° C. or more and 600° C. or less for 40 minutes or more and 80 minutes or less.

The permeability is an indicator that indicates flowability of an electrolyte in an electrode. A higher value of the permeability indicates that an electrolyte flows more easily. A ratio K1/K2 of the permeability K1 to the permeability K2, which represents how many times the permeability K2 goes into the permeability K1, is preferably 1.5 or more, more preferably 3 or more, and particularly preferably 9 or more. This is because the flow velocity in the main flow direction of an electrolyte flowing in the anisotropic electrode layer more easily becomes uniform at a flow velocity suitable for the operation of the RF battery. However, the ratio K1/K2 is preferably 100 or less, and more preferably 50 or less. This is because, in the electrode, a portion where an electrolyte flowing in the main flow direction is stagnant is reduced. As a result, it is possible to reduce the variation in the battery reaction due to the presence of a portion where the electrolyte flows at a flow velocity suitable for the operation of the RF battery and a portion where the electrolyte is stagnant, and it is expected that the internal resistance of the RF battery can be reduced. The ratio K1/K2 may be 30 or less, and furthermore 10 or less.

The permeability K1 of the anisotropic electrode layer α1 is preferably $7.0 \times 10^{-14}$ $m^2$ or more and $7.0 \times 10^{-8}$ $m^2$ or less. This is because when the permeability K1 is in the above range, the variation in the flow velocity in the main flow direction is easily reduced, and an RF battery 1 having a reduced internal resistance can be obtained. When the permeability K1 is $7.0 \times 10^{-14}$ $m^2$ or more, furthermore, $7.0 \times 10^{-13}$ $m^2$ or more, or in particular, $7.0 \times 10^{-12}$ $m^2$ or more, the pressure loss of the electrolyte can be reduced and energy loss can be reduced by combining the anisotropic electrode with a bipolar plate having a flow channel. When the permeability K1 is $7.0 \times 10^{-8}$ $m^2$ or less, furthermore, $7.0 \times 10^{-9}$ $m^2$ or less, or in particular, $7.0 \times 10^{-10}$ $m^2$ or less, it is expected that the electrolyte flowing in the main flow direction can be easily allowed to flow at a flow velocity suitable for the operation of the RF battery.

From the similar viewpoint, the permeability K2 may be $4.7 \times 10^{-14}$ $m^2$ or more and $7.0 \times 10^{-10}$ $m^2$ or less, or $4.7 \times 10^{-13}$ $m^2$ or more and $7.0 \times 10^{-11}$ $m^2$ or less. The permeability K2 may be $4.7 \times 10^{-12}$ $m^2$ or more and $7.0 \times 10^{-12}$ $m^2$ or less. The permeability K2 may be $2.4 \times 10^{-14}$ $m^2$ or more and $1.4 \times 10^{-9}$ $m^2$ or less, $2.4 \times 10^{-13}$ $m^2$ or more and $1.4 \times 10^{-10}$ $m^2$ or less, or $2.4 \times 10^{-12}$ $m^2$ or more and $1.4 \times 10^{-11}$ $m^2$ or less. The permeability K2 may be $7.8 \times 10^{-15}$ $m^2$ or more and $2.3 \times 10^{-9}$ $m^2$ or less, $7.8 \times 10^{-14}$ $m^2$ or more and $2.3 \times 10^{-10}$ $m^2$ or less, or $7.8 \times 10^{-13}$ m² or more and $2.3 \times 10^{-11}$ m² or less. The permeability K2 may be $7.0 \times 10^{-9}$ m² or less. In addition, the lower limit of the permeability K2 may be $4.65 \times 10^{-14}$ m² or more, $4.65 \times 10^{-13}$ m² or more, or $4.65 \times 10^{-12}$ m² or more. The lower limit of the permeability K2 may be $2.33 \times 10^{-14}$ m² or more, $2.33 \times 10^{-13}$ m² or more, or $2.33 \times 10^{-12}$ m² or more. Furthermore, the permeability K2 may be $7.77 \times 10^{-15}$ m² or more and $2.33 \times 10^{-9}$ m² or less, $7.77 \times 10^{-14}$ m² or more and $2.33 \times 10^{-10}$ m² or less, or $7.77 \times 10^{-13}$ m² or more and $2.33 \times 10^{-11}$ m² or less. The permeability K2 may be $7.77 \times 10^{-9}$ m² or less.

In particular, the ratio K1/K2 is preferably 1.5 or more and 100 or less while the permeability K1 and the permeability K2 are in the specific ranges described above. This is because it is expected that the effects described above are more easily exhibited. A detailed method for measuring the permeability K1 and the permeability K2 will be described in test examples described below.

(Bipolar Plate)

Figure 2:
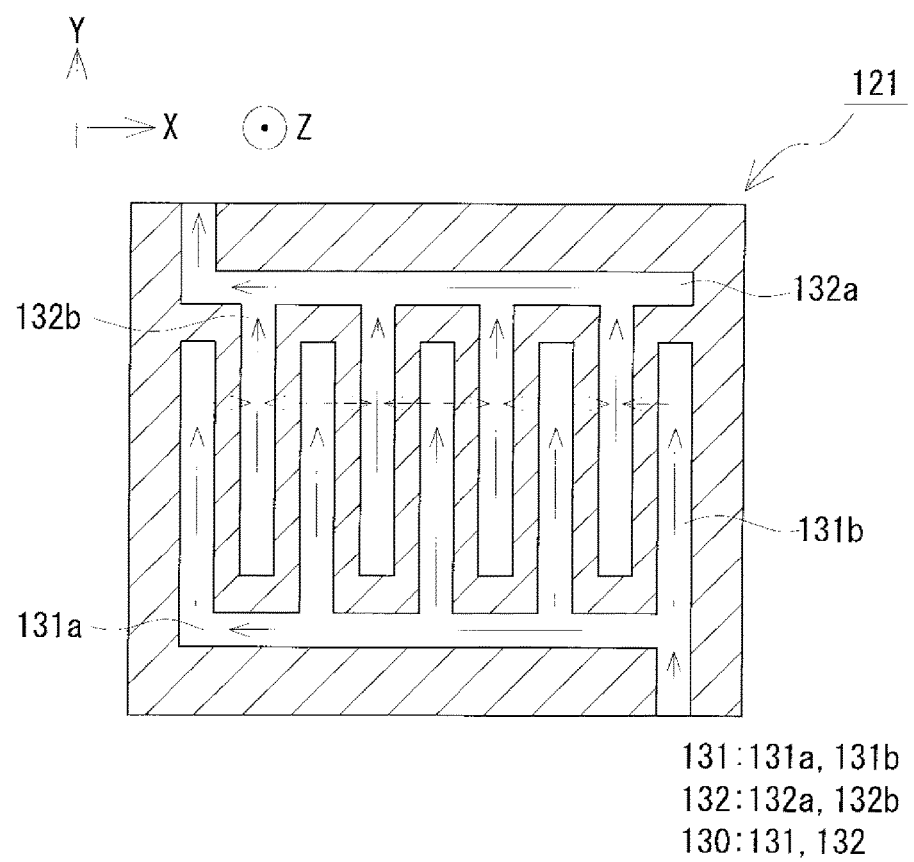
FIG. 2 is a schematic front view illustrating an interdigitated, facing comb-teeth-shaped flow channel disposed on a bipolar plate included in the RF battery according to Embodiment 1.

The bipolar plate 121 is a plate that is sandwiched between the electrodes 104 and 105 functioning as positive and negative electrodes and that partitions the respective battery cells 100. The bipolar plate is formed of a conductive plate through which an electrolyte does not pass. The direction A1 that exhibits the permeability K1 of the anisotropic electrode α is disposed so as to be parallel to the main flow direction of an electrolyte in the electrode. One of factors for determining the main flow direction is the shape of the bipolar plate 121 on the electrode side. There are a case where the surface of the bipolar plate 121 on the electrode side includes a flow channel and a case where the surface of the bipolar plate 121 on the electrode side does not include a flow channel. Here, a bipolar plate including a flow channel 130 will be described with reference to FIG. 2. In FIG. 2, the solid-line arrows each mainly show a flow of an electrolyte on an electrode surface along the flow channel 130 included in the bipolar plate 121, and the broken-line arrows each show the main flow direction of an electrolyte in the electrode. This also applies to FIGS. 3 to 7 described below.

The flow channel 130 is provided on at least one of the surface on the positive electrode 104 side and the surface on the negative electrode 105 side of the bipolar plate 121 in order to adjust a flow of an electrolyte in each cell, the electrolyte being to be allowed to flow in each electrode. The flow channel 130 includes a plurality of groove portions disposed parallel to each other. In this embodiment, the flow channel 130 has an interdigitated, facing comb-teeth shape in which an inlet channel 131 and an outlet channel 132 each include a interdigitated groove portions, and the comb teeth face each other in an interdigitated manner (refer to FIG. 2). The inlet channel 131 (outlet channel 132) is provided on a lower part (an upper part) of the bipolar plate 121, and includes a horizontal groove 131*a* (132*a*) extending in the width direction and a plurality of vertical grooves 131*b* (132*b*) extending from the horizontal groove in the upper direction (lower direction). The inlet channel 131 and the outlet channel 132 are independently arranged without communicating with each other. The vertical grooves 131*b* included in the inlet channel 131 and the vertical grooves 132*b* included in the outlet channel 132 are arranged in parallel at intervals.

(Arrangement of Anisotropic Electrode and Bipolar Plate)

Figure 24:
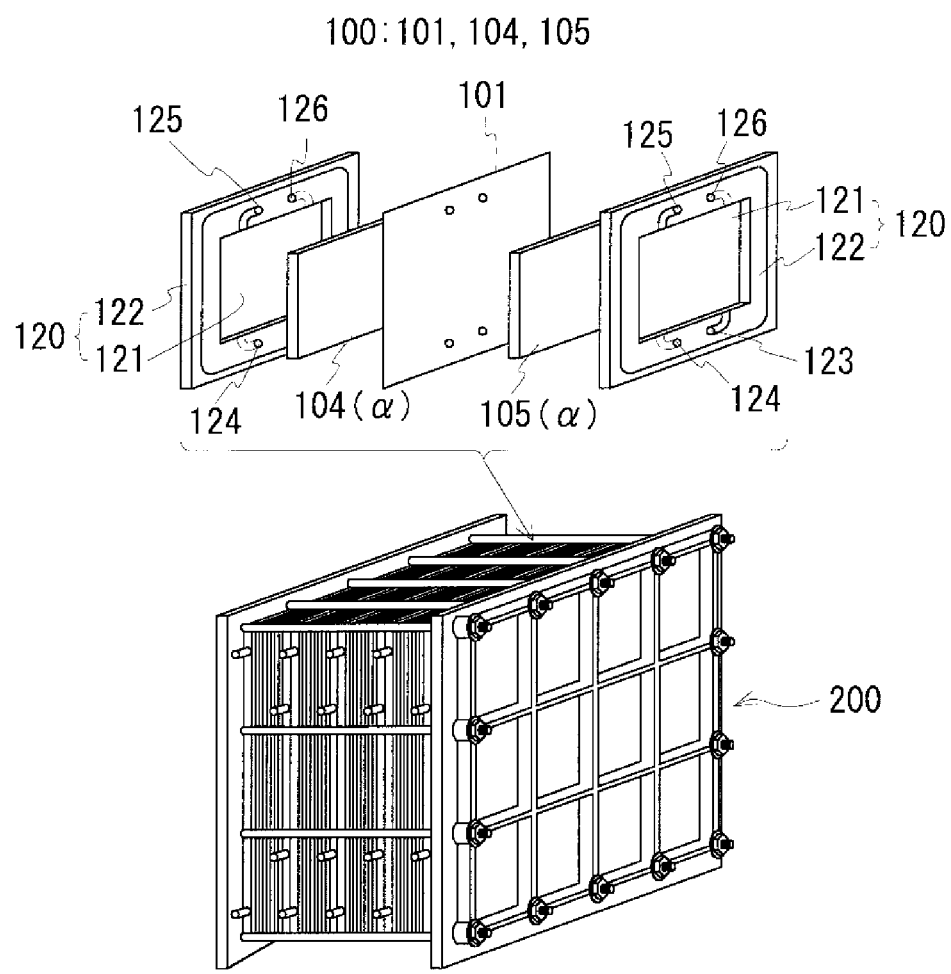
FIG. 24 includes schematic structural views of a cell stack included in an RF battery.

The anisotropic electrode α described above is disposed such that the direction A1 that exhibits a high permeability K1 is parallel to the main flow direction of an electrolyte in the electrode. The term "main flow direction" refers to a flow direction of an electrolyte that is mainly involved in a battery reaction in an electrode. The flow direction of an electrolyte that is mainly involved in a battery reaction is determined on the basis of the positional relationship between an inlet port for introducing the electrolyte into the electrode and an outlet port for discharging the electrolyte from the electrode, and the shape of a surface of the bipolar plate on the electrode side. In this embodiment, the liquid supply manifold 123 (124) and the liquid discharge manifold 125 (126) in FIG. 24 correspond to the inlet port and the outlet port, respectively. In FIG. 24, the inlet port and the outlet port are disposed in the upper and lower parts of the cell frame. Alternatively, the inlet port and the outlet port may be provided in the left and right parts of the cell frame. This also applies to any of Embodiments 2 to 7 described below.

When the surface of the bipolar plate on the electrode side is a flat surface, the main flow direction is a direction from the side on which the inlet port of an electrolyte is disposed to the side on which the outlet port of the an electrolyte is disposed in each electrode cell. For example, in FIG. 24, the inlet port 123 (124) is disposed on the lower side of each electrode cell (cell frame 120), and the outlet port 125 (126) is disposed on the upper side of each electrode cell (cell frame 120). Therefore, the direction toward the upper side is the main flow direction. This is because, in this case, an electrolyte introduced from the lower side preferentially flows toward the upper side, though the electrolyte spreads in the left and right directions of the electrode, and a battery reaction is performed during the process of this flow. Even when the inlet port 123 (124) and the outlet port 125 (126) are shifted in the width direction of the cell frame 120, the main flow direction is defined on the basis of only the direction in which the inlet port 123 (124) and the outlet port 125 (126) face each other (the top-bottom direction in FIG. 24) without considering the shift of the inlet port and the outlet port.

In contrast, when the surface of the bipolar plate on the electrode side includes a flow channel having a plurality of groove portions disposed in parallel, the main flow direction is, in principle, a direction in which the groove portions are disposed in parallel regardless of the direction in which the inlet port and the outlet port face each other. For example, when the above-described flow channel having an interdigitated, facing comb-teeth shape is provided, the direction in which the vertical grooves 131*b* and 132*b* are disposed in parallel is the main flow direction.

Figure 3:
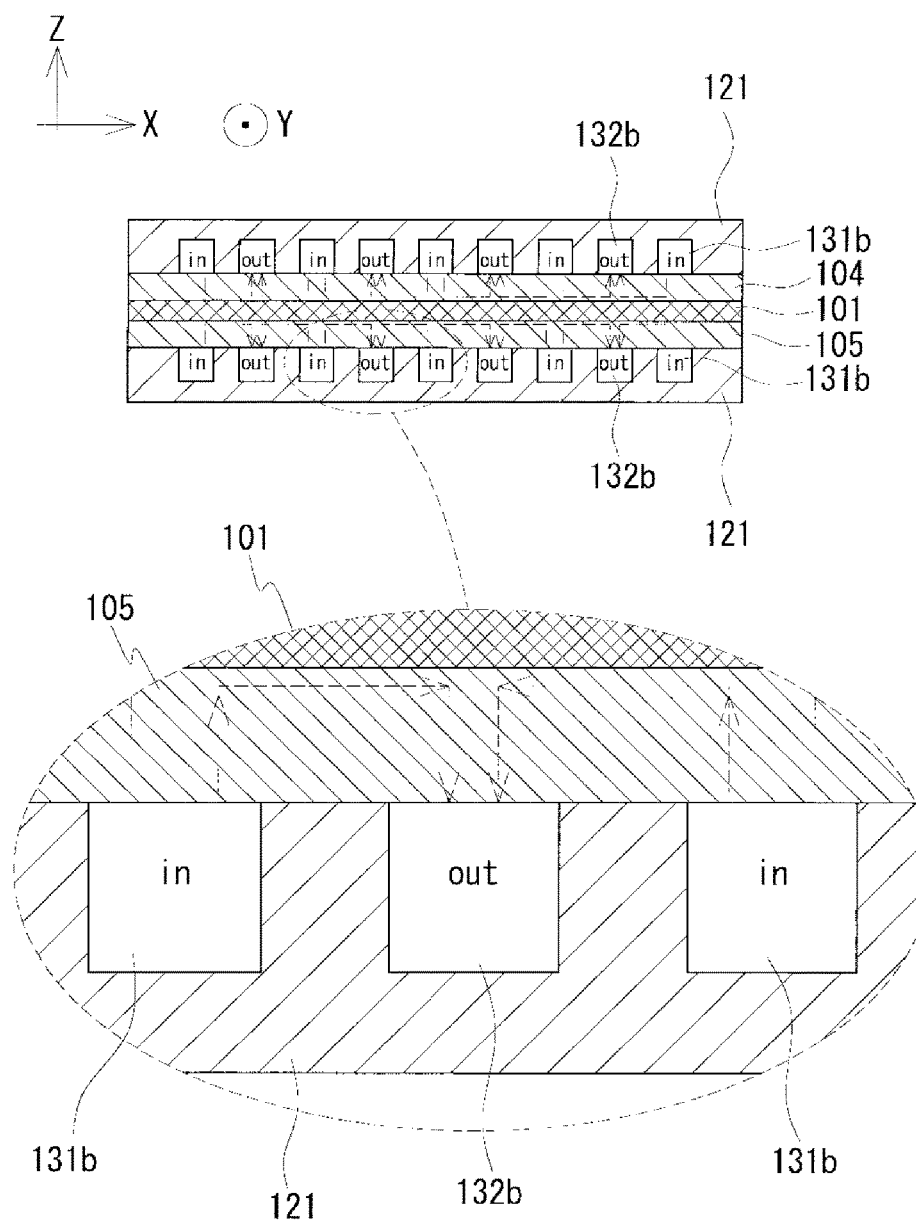
FIG. 3 includes schematic cross-sectional views illustrating a flow of an electrolyte in the interdigitated, facing comb-teeth-shaped flow channel disposed on a bipolar plate included in the RF battery according to Embodiment 1.

In the case where the flow channel 130 having an interdigitated, facing comb-teeth shape is provided, a flow state of an electrolyte in an electrode will be described with reference to FIGS. 2 and 3. FIG. 3 includes cross-sectional views in the width direction, the views each illustrating a portion where the vertical grooves 131*b* and 132*b* in FIG. 2 are disposed in parallel. The top-bottom direction of FIG. 3 is defined as a thickness (Z direction), and the left-right direction of FIG. 3 is defined as a width (X direction). As illustrated in FIG. 2, an electrolyte introduced from the inlet channel 131 into an electrode passes through each of electrodes 104 and 105 and flows in the outlet channel 132. The vertical grooves 131*b* of the inlet channel and the vertical grooves 132*b* of the outlet channel are alternately disposed in parallel in the X direction, as illustrated in the upper drawing of FIG. 3. Therefore, as illustrated in the enlarged view of FIG. 3, the electrolyte supplied from a vertical groove 131*b* to an electrode flows so as to pass through a portion in an anisotropic electrode layer α1, the portion being located between the vertical groove 131*b* and a vertical groove 132*b*, and is discharged to the vertical groove 132b. Hereinafter, in an electrode, a portion disposed between a groove portion and a groove portion that are provided in a flow channel of a bipolar plate is collectively referred to as a "ridge portion". In the present embodiment, (1) a portion in each of the electrodes 104 and 105, the portion being located between a vertical groove 131b and a vertical groove 132b and (2) a portion located between the horizontal groove 131a (132a) and a vertical groove 132b (131b) are the ridge portions. The battery reaction is mainly performed when an electrolyte flows so as to pass through a ridge portion between the two vertical grooves 131b and 132b. Therefore, the direction in which the vertical grooves 131b and 132b are arranged in parallel (X direction) is the main flow direction (refer to the broken-line arrows in FIGS. 2 and 3).

Figure 23:
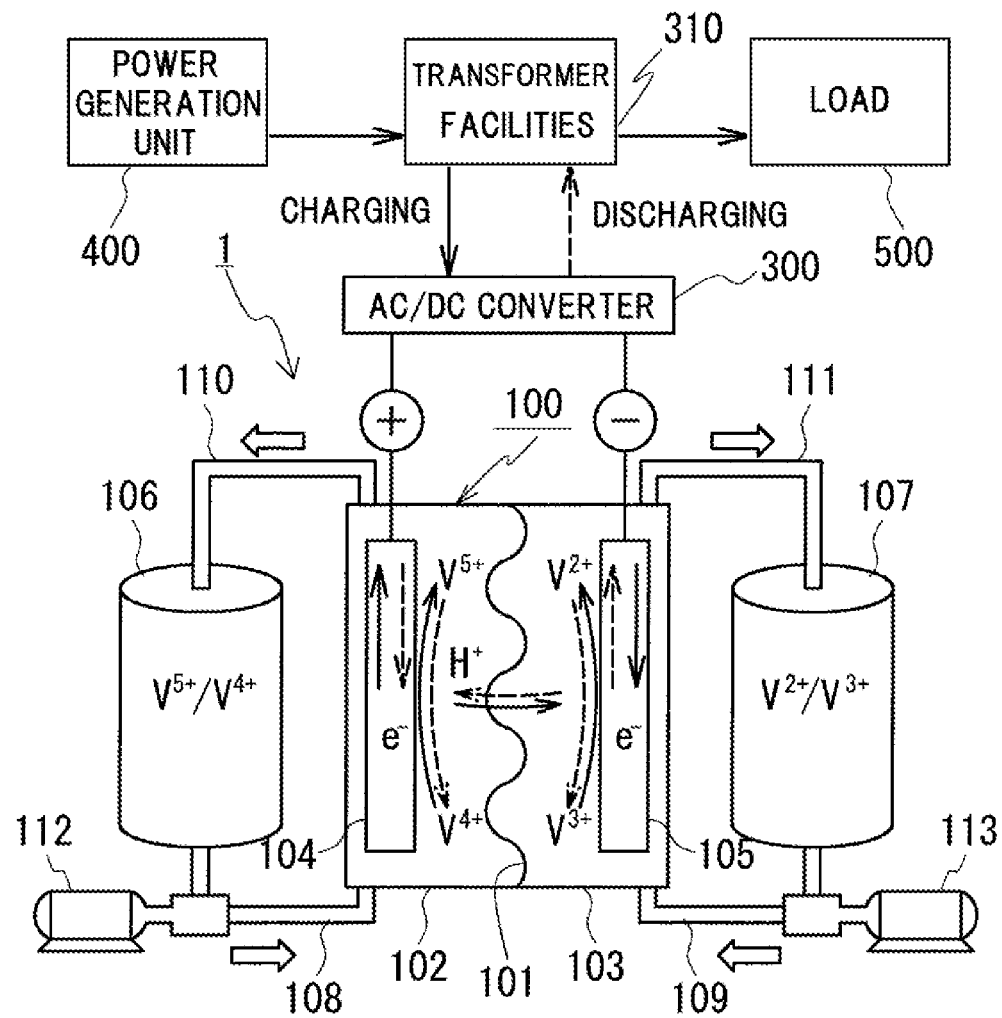
FIG. 23 is a schematic principle view of an RF battery.

Accordingly, when a surface of the bipolar plate 121 on the electrode side is a flat surface, the anisotropic electrode α is disposed such that the direction A1 of the electrode is substantially parallel to a direction from the side on which the inlet port 123 (124) of the electrolyte is disposed to the side on which the outlet port 125 (126) is disposed in the electrode cell 102 or 103 (the top-bottom direction of the cell frame in FIG. 24). When a surface of the bipolar plate 121 on the electrode side includes the flow channel 130 having a plurality of groove portions disposed in parallel, the anisotropic electrode α is disposed such that the direction A1 of the electrode is substantially parallel to a direction in which the groove portions are disposed in parallel (X direction in FIG. 2). The phrase "disposed so as to be substantially parallel" covers not only a case where the main flow direction and the direction A1 are disposed in parallel but also a case where the main flow direction and the direction A1 are disposed in a state in which there is a difference in an angle of ±30° or less between the main flow direction and the direction A1. In particular, when the difference in the angle is ±10° or less, and furthermore, ±5° or less, it is expected that the variation in the flow velocity in the main flow direction in the electrode can be reduced. A cell stack produced by using an anisotropic electrode and a bipolar plate that have such an arrangement relationship is connected between a power generation unit 400 and a load 500 through an AC/DC converter 300 and transformer facilities 310, as illustrated in FIG. 23.

(Operations and Effects)

The RF battery of the present embodiment described above has the following operations and effects.

(1) By disposing a direction that exhibits a high permeability K1 of an anisotropic electrode so as to be substantially parallel to the main flow direction, it is possible to increase a portion where an electrolyte flows in the main flow direction in the electrode at a flow velocity suitable for the operation of the RF battery, and to decrease a portion where the electrolyte flowing in the main flow direction is stagnant in the electrode. Consequently, the variation in the flow velocity in the main flow direction can be reduced. Therefore, the electrolyte easily flows evenly over the wide range in the electrode, and thus an RF battery having a reduced internal resistance can be obtained.

(2) When a bipolar plate includes a flow channel having a plurality of groove portions, an electrolyte can be easily supplied along the groove portions to a wide range of an electrode at a low pressure loss, and a flow of the electrolyte through the electrode is easily generated between adjacent groove portions. Accordingly, the amount of electrolyte flowing in the electrode in the main flow direction is easily increased, and it is expected that the amount of a reaction current is increased, and furthermore, the internal resistance is reduced. With this supply of the electrolyte at a low pressure loss and the increase in the amount of the reaction current, the energy efficiency can be improved as a whole RF battery.

(Supplementary Notes to Structure of RF Battery)

Structures, operations, and effects that mainly relate to features of Embodiment 1 have been described. Furthermore, the RF battery may have the following structures.

<<Electrode Thickness>>

A thickness (d) of the anisotropic electrode α can be freely adjusted in accordance with the structure of the cell stack 200, mainly, the degree of compression of the anisotropic electrode α. In particular, the thickness of the anisotropic electrode α is preferably 1,000 μm or less in a state in which the anisotropic electrode α is disposed between the membrane 101 and the bipolar plate 121. This is because a small thickness of the anisotropic electrode α can reduce the internal resistance of the RF battery. The thickness of the anisotropic electrode α is more preferably 500 μm or less, and still more preferably 300 μm or less. However, considering the pressure loss of an electrolyte in the electrode, the thickness of the anisotropic electrode α is preferably 50 μm or more, and more preferably 100 μm or more. When the anisotropic electrode α is a multilayer electrode described below, the anisotropic electrode α also preferably has the above thickness as a thickness of the whole multilayer electrode.

<<Material of Bipolar Plate and Method for Producing Bipolar Plate>>

The material of the bipolar plate is more preferably a material having acid resistance and suitable rigidity.

This is because the cross-sectional shape and dimensions of a flow channel are unlikely to change for a long time, and the effect of the flow channel is easily maintained. Examples of such a material include conductive materials containing carbon. More specifically, examples thereof include conductive plastics formed from graphite and a polyolefin-based organic compound or chlorinated organic compound. In the conductive plastics, part of graphite may be replaced with at least one of carbon black and diamond-like carbon. Examples of the polyolefin-based organic compound include polyethylene, polypropylene, and polybutene. Examples of the chlorinated organic compound include vinyl chloride, chlorinated polyethylene, and chlorinated paraffins. The bipolar plate formed of such a material can have a reduced electrical resistance and good acid resistance.

The bipolar plate can be produced by forming the above material into a plate by a known method such as injection molding, press forming, or vacuum forming. When the bipolar plate includes a flow channel, the flow channel may be formed at the same time of the formation of the bipolar plate. In this case, the bipolar plate is produced with a good production efficiency. Alternatively, a bipolar plate having no flow channel may be produced, and a flow channel may then be formed by cutting a surface of the bipolar plate.

<<Other Structures of Flow Channel>>

The flow channel (groove portion) may have any cross-sectional shape. Examples of the cross-sectional shape include a rectangular shape and a semicircular shape. In a case of a rectangular or semicircular shape, it is expected that (1) a flow channel is easily formed on a bipolar plate (easily processed) and (2) the pressure loss of an electrolyte flowing in a flow channel is low.

The width per groove portion is preferably 0.1 mm or more and 10 mm or less. This is because the following advantages can be expected. (1) The uniformity of the flow velocity of the whole electrode further improves. (2) The flow rate of an electrolyte flowing in the electrode can be increased. (3) The electrode is unlikely to fall in the flow channel (groove portion). (4) The pressure loss of an electrolyte flowing in the flow channel can be further reduced. The width of the flow channel is more preferably 0.2 mm or more and 2 mm or less, and still more preferably 0.5 mm or more and 1.5 mm or less.

The depth of the groove portion is preferably 50% or more and 99% or less of the thickness of the bipolar plate. This is because the following advantages can be expected. (1) The uniformity of the flow velocity of the whole electrode further improves. (2) The flow rate of the electrolyte flowing into a region of the electrode on the membrane side can be increased. (3) The electrode is unlikely to fall in the flow channel (groove portion). (4) The pressure loss of the electrolyte flowing in the flow channel can be further reduced. (5) Even when the bipolar plate includes a flow channel, the bipolar plate can have a sufficient mechanical strength. The depth of the flow channel is more preferably 70% or more and 80% or less of the thickness of the bipolar plate. When grooves are provided in both surfaces of the bipolar plate, groove portions may be formed at positions that do not overlap in perspective plan view. In this manner, groove portions each having the above depth can be formed in the two surfaces of the bipolar plate.

The flow channel is preferably disposed such that the gap between a plurality of groove portions (the vertical grooves 131b and 132b in FIG. 2) that are disposed in parallel is uniform. Furthermore, the gap between the adjacent vertical grooves 131b and 132b in the interdigitated, facing comb-teeth shape is preferably equal to the gap between the edge of each of the vertical grooves 131b (132b) and the horizontal groove 132a (131a) that faces the edge. This is because the flow of the electrolyte flowing in the electrode so as to pass through these gaps becomes uniform, and it is expected that the pressure loss can be further reduced.

The numbers of the vertical grooves 131b and 132b and the horizontal grooves 131a and 132a can be appropriately adjusted. For example, in the interdigitated, facing comb-teeth shape described above, when the number of the vertical grooves 131b and 132b exceeds 10 in total, a large effect of reducing the pressure loss of the electrolyte flowing in the flow channel is expected.

In the interdigitated, facing comb-teeth shape, the length of each of portions where the vertical grooves 131b and the vertical grooves 132b are interdigitated with each other is preferably as long as possible. This is because the flow velocity of an electrolyte flowing in the main flow direction becomes easily more uniform in the whole electrode, and a reduction in the internal resistance of the RF battery 1 can be expected. In addition, since the pressure loss of the electrolyte is further reduced, the RF battery has a better energy efficiency. Specifically, the length of each of portions where the vertical grooves 131b and the vertical grooves 132b are interdigitated with each other is preferably 80% or more, and more preferably 90% or more of the length of the bipolar plate 121 in the height direction (Y direction).

<<Electrolyte>>

A vanadium-based electrolyte in which vanadium ions are used as electrode active materials can be suitably used as the electrolyte, as illustrated in FIG. 23. Alternatively, an iron ($Fe^{2+}/Fe^{3+}$)-chromium ($Cr^{3+}/Cr^{2+}$)-based electrolyte in which iron (Fe) ions are used as a positive electrode active material and chromium (Cr) ions are used as a negative electrode active material, or a manganese ($Mn^{2+}/Mn^{3+}$)-titanium ($Ti^{4+}/Ti^{3+}$)-based electrolyte in which manganese (Mn) ions are used in a positive electrode electrolyte and titanium (Ti) ions are used in a negative electrode electrolyte can be suitably used.

Embodiment 2

In Embodiment 2, a description will be made of an RF battery that includes a bipolar plate including an interdigitated, facing comb-teeth-shaped flow channel which is different from that of Embodiment 1 and in which horizontal grooves are disposed in parallel in the longitudinal direction. The RF battery of Embodiment 2 has a structure common to that of Embodiment 1 except for the structure of the bipolar plate and the arrangement direction of the anisotropic electrode. Thus, these differences will be described and a description of other structures is omitted. This also applies to other embodiments described below.

In the interdigitated, facing comb-teeth shape in the present embodiment, an inlet channel (outlet channel) is provided on the left side (right side) of a bipolar plate and includes a vertical groove extending in the height direction (Y direction) and a plurality of horizontal grooves extending from the vertical groove in the right direction (left direction). In the case of the interdigitated, facing comb-teeth shape in which the horizontal grooves are interdigitated with each other, in an electrode, a flow that passes through a region facing a ridge portion located between the horizontal grooves of the bipolar plate becomes the main flow. Thus, the main flow direction is the Y direction in FIG. 2. Accordingly, the anisotropic electrode α is disposed such that the direction A1 is parallel to the Y direction. With this structure, the variation in the flow velocity of the electrolyte flowing in the electrode in the main flow direction (Y direction) is easily reduced.

Embodiment 3

Figure 4:
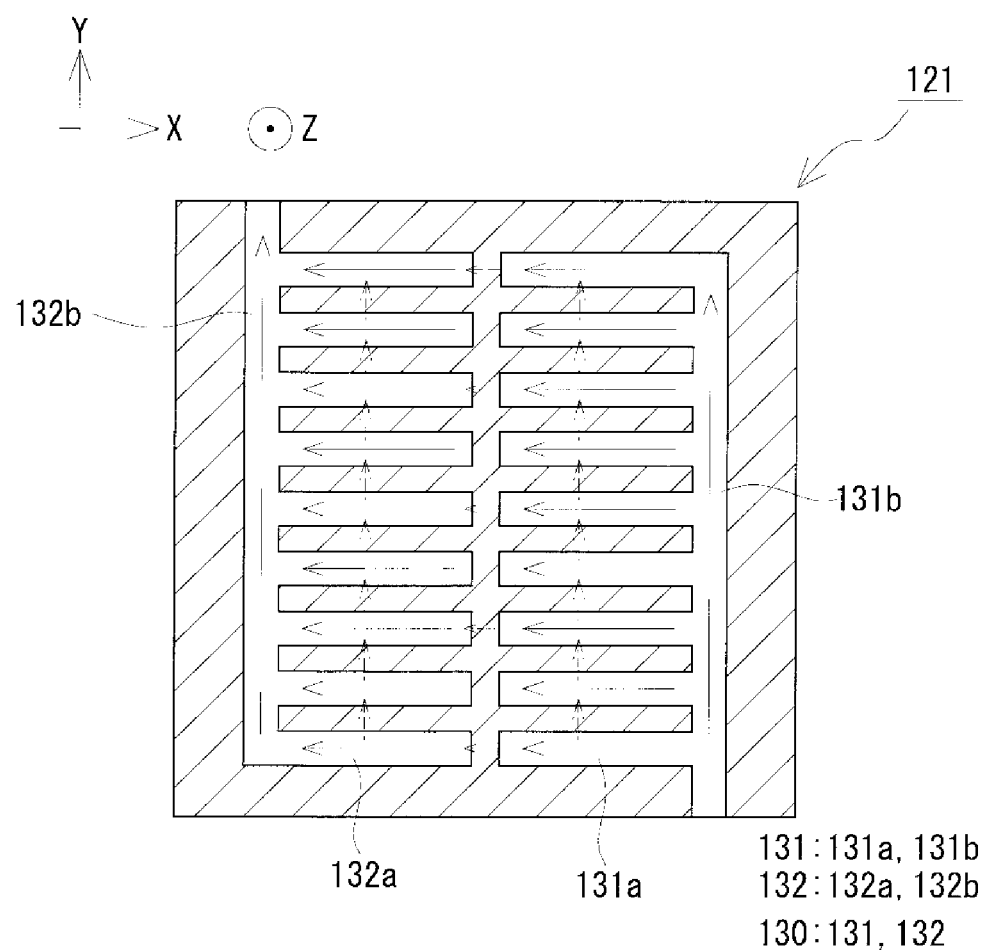
FIG. 4 is a schematic front view illustrating a non-interdigitated, facing comb-teeth-shaped flow channel disposed on a bipolar plate included in an RF battery according to Embodiment 3.

In Embodiment 3, a description will be made of an RF battery that includes a bipolar plate including a non-interdigitated, facing comb-teeth-shaped flow channel illustrated in FIG. 4. The non-interdigitated, facing comb-teeth shape is a shape in which an inlet channel 131 and an outlet channel 132 are not interdigitated with each other. The inlet channel 131 and the outlet channel 132 have shapes that are symmetric with respect to a point. The inlet channel 131 (outlet channel 132) has a shape including a vertical groove 131b (132b) provided on the right side (left side) of a bipolar plate 121 and a plurality of horizontal grooves 131a (132a) extending from the vertical groove 131b (132b) to the left side (right side). In this case, in each of the electrodes 104 and 105, a flow that passes through a region facing a ridge portion located between a horizontal groove 131a and a horizontal groove 132a of the bipolar plate 121 is the main flow. Thus, the main flow direction is the Y direction in FIG. 4. Accordingly, an anisotropic electrode α is disposed such that the direction A1 is parallel to the Y direction. With this structure, the variation in the flow velocity of the electrolyte in the main flow direction (Y direction) is easily reduced.

Alternatively, the inlet channel 131 (outlet channel 132) may have a shape including a plurality of vertical grooves 131b (132b) and a horizontal groove 131a (132a) from which the vertical grooves 131b (132b) extend. This shape is a shape in which the inlet channel 131 and the outlet channel 132 are not interdigitated with each other in the interdigitated, facing comb-teeth shape illustrated in FIG. 2. In this case, the direction (X direction) in which the vertical grooves 131b (132b) are disposed in parallel is the main flow direction. Accordingly, an anisotropic electrode α is disposed such that the direction A1 is parallel to the X direction.

Embodiment 4

Figure 5:
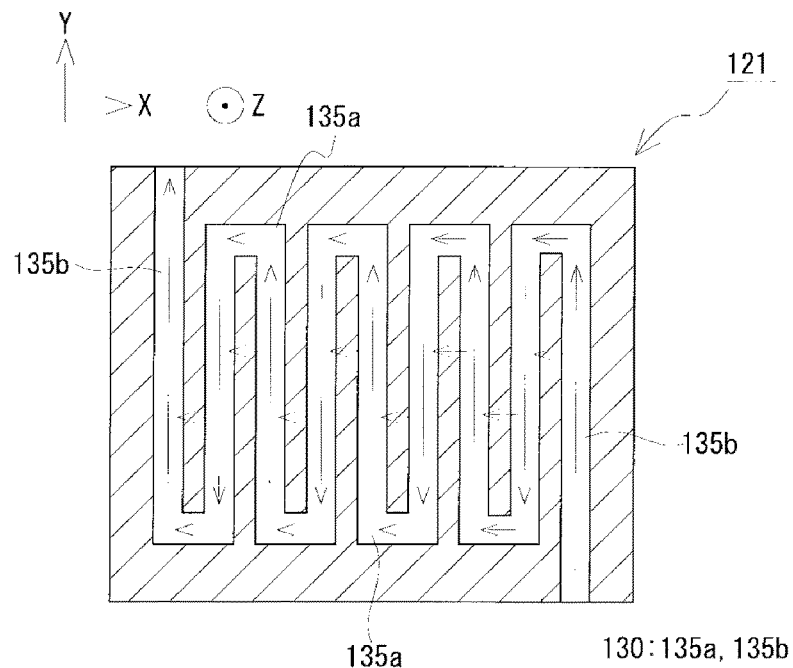
FIG. 5 is a schematic front view illustrating a continuous meandering-shaped flow channel disposed on a bipolar plate included in an RF battery according to Embodiment 4.

In Embodiment 4, a description will be made of an RF battery that includes a bipolar plate including a continuous meandering-shaped flow channel illustrated in FIG. 5. The continuous meandering shape forms a continuous flow channel extending from an inlet port to an outlet port, and includes a plurality of long groove portions 135b that are arranged in parallel in the width direction (X direction) of the bipolar plate 121 so as to be adjacent to each other, and a plurality of short groove portions 135a that alternately connect one ends or the other ends of the long groove portions 135b to each other. In this case, a flow that passes from a long groove portion 135b on the inlet port side to another long groove portion 135b disposed on the outlet port side and adjacent to the long groove portion 135b on the inlet port side is the main flow (refer to the broken-line arrows in FIG. 5).

That is, the direction in which the long groove portions 135b are disposed in parallel (X direction) is the main flow direction. Accordingly, an anisotropic electrode α is disposed such that the direction A1 is parallel to the X direction.

The meandering shape may be a shape including a plurality of long groove portions 135b that are arranged in parallel in the height direction (Y direction in FIG. 5) of the bipolar plate 121 so as to be adjacent to each other, and a plurality of short groove portions 135a that alternately connect one ends or the other ends of the long groove portions 135b to each other. In this case, the direction in which the long groove portions 135b to be disposed in parallel are disposed in parallel (Y direction in FIG. 5) is the main flow direction.

Accordingly, an anisotropic electrode α is disposed such that the direction A1 is parallel to the Y direction.

(Operations and Effects)

The RF battery of the present embodiment described above has the following operations and effects.

(1) Since the flow channel is continuous, the flow of an electrolyte flowing in the flow channel can be made smooth, and the pressure loss of the electrolyte can be reduced.

(2) Since the flow channel has a meandering shape while being a continuous flow channel, a flow of an electrolyte through an anisotropic electrode is easily generated between adjacent long groove portions. Accordingly, it is expected that the amount of a reaction current is increased, and furthermore, the internal resistance is reduced.

(3) An electrolyte is easily spread evenly over a wide range of a plane of an anisotropic electrode depending on the number and the formation region of the long groove portions. Accordingly, since the electrolyte is introduced from a region of a wide range of the plane of the anisotropic electrode into the electrode, it is expected that a uniform battery reaction is performed.

Embodiment 5

Figure 6:
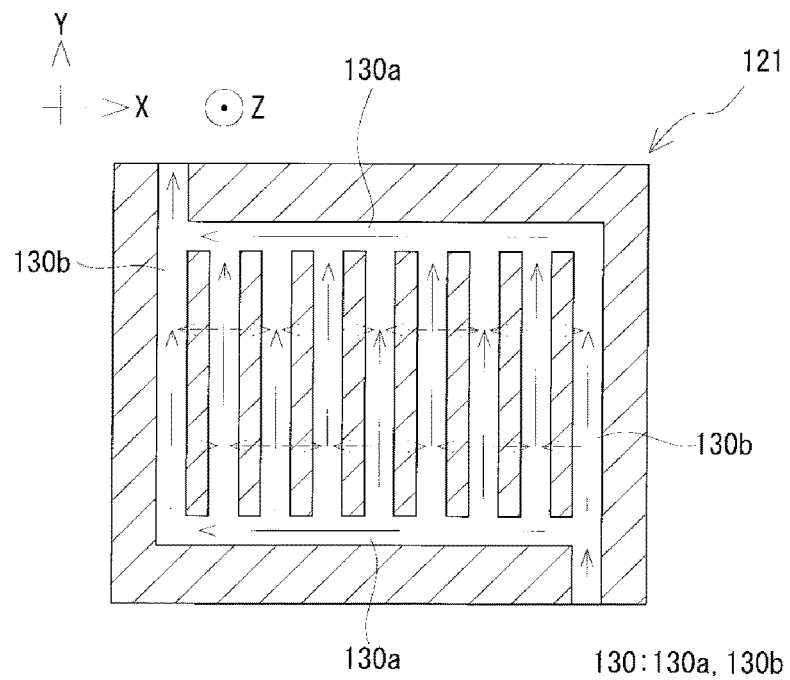
FIG. 6 is a schematic front view illustrating a continuous grid-shaped flow channel disposed on a bipolar plate included in an RF battery according to Embodiment 5.

In Embodiment 5, a description will be made of an RF battery that includes a bipolar plate including a continuous grid-shaped flow channel illustrated in FIG. 6. In the present embodiment, the flow channel has a vertical grid shape. The vertical grid shape includes a plurality of vertical grooves 130b extending in the height direction of a bipolar plate 121 and a pair of horizontal grooves 130a disposed so as to continuously connect upper and lower ends of the vertical grooves 130b. In this case, the direction in which the vertical grooves 130b to be disposed in parallel are disposed in parallel (X direction) is the main flow direction. Accordingly, an anisotropic electrode α is disposed such that the direction A1 is parallel to the X direction. With this structure, the variation in the flow velocity of an electrolyte in the main flow direction (X direction) is easily reduced.

An example of another grid shape is a horizontal grid shape. The horizontal grid shape includes a plurality of horizontal grooves disposed in parallel in the height direction (Y direction) of a bipolar plate and a pair of vertical grooves disposed on the left and the right so as to continuously connect the horizontal grooves. In this case, the direction in which the horizontal grooves are disposed in parallel (Y direction) is the main flow direction. Accordingly, an anisotropic electrode α is disposed such that the direction A1 is parallel to the Y direction. With this structure, the variation in the flow velocity of an electrolyte in the main flow direction (Y direction) is easily reduced.

Embodiment 6

Figure 7:
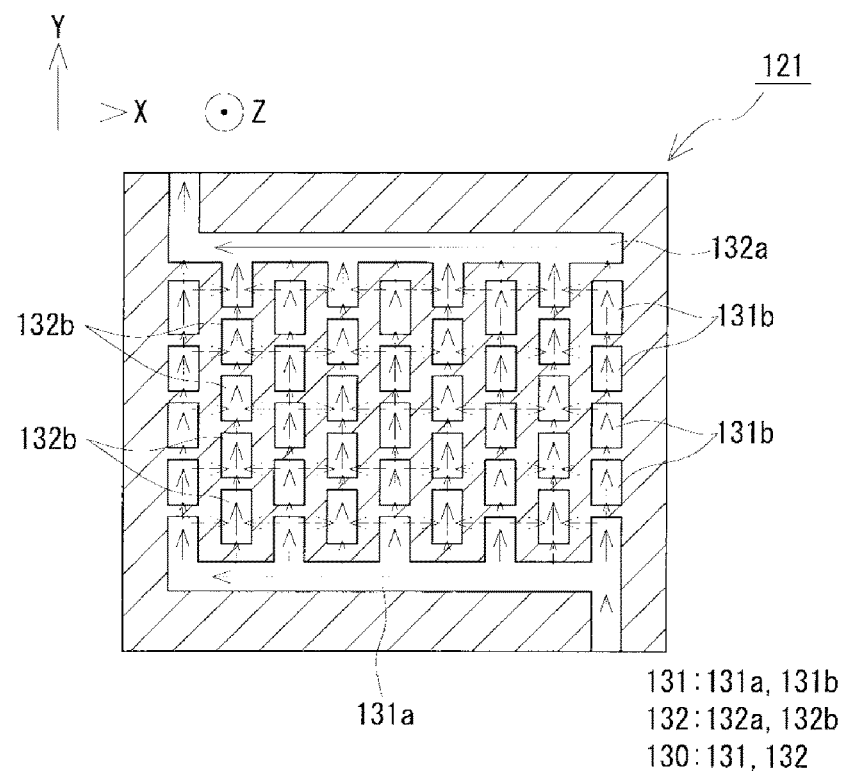
FIG. 7 is a schematic front view illustrating a broken-line-shaped flow channel disposed on a bipolar plate included in an RF battery according to Embodiment 6.
Figure 8:
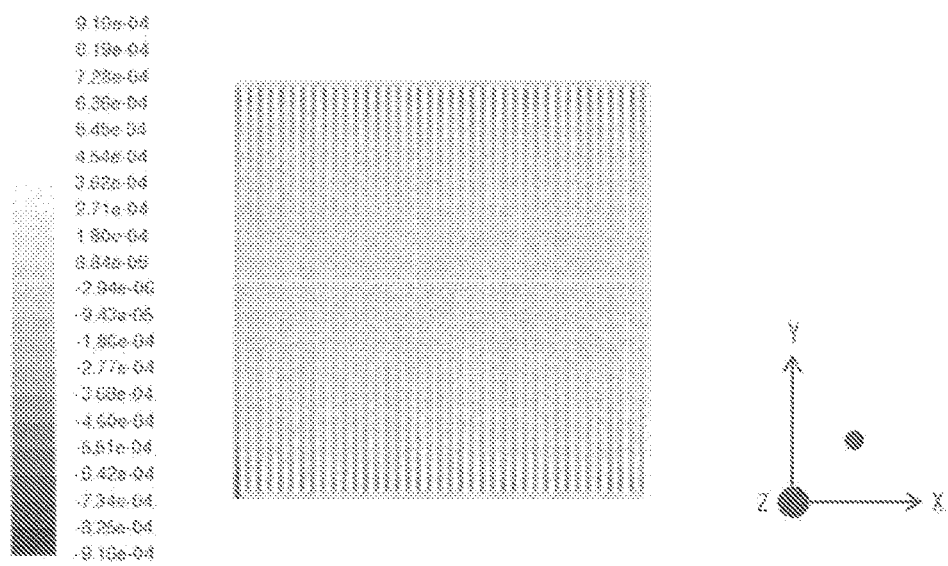
FIG. 8 is a schematic view showing a flow-velocity distribution in a main flow direction (X direction) in Test example 1-1.

In Embodiment 6, a description will be made of an RF battery that includes a bipolar plate including a broken-line-shaped flow channel illustrated in FIG. 7. In the present embodiment, the flow channel has a broken-line shape in which vertical grooves 131b (132b) that constitute the interdigitated, facing comb-teeth shape illustrated in FIG. 2 are intermittently (discontinuously) formed. With this structure, an electrolyte easily flows through each of the electrodes 104 and 105 so as to pass through not only ridge portions in the width direction but also ridge portions between groove portions (vertical grooves 131b (132b)) adjacent to each other in the height direction (refer to the broken-line arrows in FIG. 7), and thus it is expected that the amount of a reaction current increases. Accordingly, it is expected that the amount of current of the RF battery increases, and furthermore, the internal resistance of the RF battery can be reduced.

The horizontal groove 131a (132a) may be intermittently formed. Only a part of a flow channel 130 may have a broken-line shape. In each of the embodiments described above as examples, at least a part of the flow channel may be intermittently formed.

Also in this embodiment, in each of the electrodes 104 and 105, a flow that passes through a region facing a ridge portion located between a vertical groove 131b and a vertical groove 132b of a bipolar plate 121 becomes the main flow. Thus, the main flow direction is the X direction in FIG. 7. Accordingly, an anisotropic electrode α is disposed such that the direction A1 is parallel to the X direction. With this structure, the variation in the flow velocity of an electrolyte in the main flow direction (X direction) is easily reduced.

Embodiment 7

In Embodiment 7, a description will be made of an RF battery that includes a multilayer electrode including an anisotropic electrode layer α1. The RF battery of Embodiment 7 is an embodiment in which the single-layer electrode used in Embodiments 1 to 6 described above is changed to a multilayer electrode. The RF battery of the present embodiment has a structure common to those of the embodiments except for the above. Accordingly, only the multilayer electrode will be described, and a description of other structures is omitted.

Examples of the multilayer electrode include (1) an electrode obtained by stacking two or more anisotropic electrode layers having different degrees of anisotropy, (2) an electrode obtained by stacking at least one anisotropic electrode layer α1 and at least one isotropic electrode layer, and (3) an electrode obtained by stacking at least one anisotropic electrode layer α1 and at least one base layer formed of a material through which an electrolyte flows but a battery reaction is not caused. In the case of a multilayer electrode, the permeability of the anisotropic electrode layer α1 can be measured by peeling and separating an electrode layer and a base layer, which form the multilayer electrode, from each other.

In the case of a multilayer electrode including two or more different anisotropic electrode layers, it is believed that the direction A1 is preferably determined using, as a standard, an anisotropic electrode layer in which the permeability K1 is 1.5 times or more and 100 times or less, furthermore, 3 times or more and 50 times or less, and in particular, 9 times or more and 30 times or less the permeability K2, though it depends on the magnitude of the permeabilities and the thicknesses of the anisotropic electrode layers. This is because it is expected that when the anisotropy is in the above range, an electrolyte easily flows evenly in the electrode at a flow velocity suitable for the operation of the RF battery, and a portion where an electrolyte flowing in the main flow direction is stagnant in the electrode is easily reduced.

In the case of a multilayer electrode including two or more different anisotropic electrode layers, it is expected that an anisotropic electrode layer having an anisotropy in the above range is preferably located on the membrane 101 side. The reason for this is as follows. With this structure, it is easy to form a flow of an electrolyte that flows in the main flow direction while the electrolyte flows to the membrane side. In addition, since the variation in the flow velocity in the main flow direction is reduced, it is expected that the variation in the transfer of hydrogen ions between electrodes is reduced. Accordingly, it is expected that the internal resistance of the RF battery can be further reduced. From the same viewpoint, when a multilayer electrode obtained by stacking an anisotropic electrode layer α1 and an isotropic electrode layer is used as an electrode, it is preferable that the anisotropic electrode layer α1 be disposed so as to be located on the membrane 101 side. This also applies to a case where a multilayer electrode obtained by stacking an anisotropic electrode layer α1 and a base layer is used.

Test Example 1

In Test example 1, characteristics of the RF batteries of the embodiments were examined by a simulation. In this test example, Model 1 that included a bipolar plate including the interdigitated, facing comb-teeth shaped flow channel illustrated in FIG. 2 was formed using simulation analysis software (manufactured by ANSYS Japan K.K., ANSYS Fluent). Model 1 is an RF battery having a single-cell structure including a positive electrode cell and a negative electrode cell. In this case, anisotropic electrodes having the same structure were set as a positive electrode and a negative electrode. In Model 1, an electrolyte is introduced from a lower part of the bipolar plate and discharged from an upper part of the bipolar plate as in Embodiment 1 described above. Therefore, as in Embodiment 1 described above, the top-bottom direction was defined as a height (Y direction), the left-right direction was defined as a width (X direction), and a direction orthogonal to the X direction and the Y direction was defined as a thickness (Z direction). Accordingly, in Model 1, an anisotropic electrode is disposed such that the direction A1 (direction that exhibits a high permeability) is parallel to the X direction.

Furthermore, for comparison, Model 2 was formed to have the same structure as Model 1 except that an isotropic electrode was used. In the two models, when the flow rate of an electrolyte was changed to various values, a flow velocity distribution of an electrolyte in the electrode in the X direction and the Y direction (a ratio of a flow velocity of the electrolyte in the X direction to a flow velocity of the electrolyte in the Y direction, hereinafter referred to as "X-Y velocity ratio") was examined. Detailed test conditions are described below. Table I shows the obtained test results. FIGS. 8 to 13 show the distribution of the flow velocity in the X direction in respective test examples. The X-direction flow velocity, the Y-direction flow velocity, and the X-Y velocity ratio in Table I show values in the center of the electrode at which the velocity in the X direction is the lowest. In FIGS. 8 to 13, the X-direction flow velocity is represented by the shading shown in the chart in each drawing. Here, the drawings show that the lighter the shading, the higher the flow velocity in the right direction, and that the deeper the shading, the higher the flow velocity in the left direction. Specific values of the flow velocity are represented by the numerical values written in the chart. The positive values show flow velocities in the right direction. A larger value represents a higher flow velocity in the right direction. The negative values show flow velocities in the left direction. A smaller value represents a higher flow velocity in the left direction. In each of the drawings, a portion (region) showing vertical stripes having a higher contrast shows a region where an electrolyte flows in the main flow direction (X direction) at a flow velocity more suitable for the operation of the RF battery.

(Test Conditions)

<<Electrode>>

Length: 15.8 (cm), Width: 15.8 (cm), Thickness: 0.05 (cm)

Electrode reaction area density (A): 50,000 (1/m)

Electrode reaction rate constant (k): $3.0 \times 10^6$ (m/s)

Permeability

[Model 1] K1: $7.56 \times 10^{-11}$ K2: $1.95 \times 10^{-11}$

[Model 2] K: $7.00 \times 10^{-11}$

<<Electrolyte>>

Sulfuric acid V aqueous solution (V concentration: 1.7 mol/L, sulfuric acid concentration: 3.4 mol/L)

State of charge (may be referred to as depth of charge): 50%

<<Electrolyte Flow Rate, Etc.>>

Inlet flow rate: 75, 150, or 300 (ml/min)

Outlet flow rate: Free discharge

Flow model: Laminar flow model

<<Bipolar Plate>>

Height (Y direction)·Width (X direction): 15.8 (cm)

[Flow Channel]

Groove shape: Interdigitated, facing comb-teeth shape

Number of vertical grooves: Inlet channel 39×Outlet channel 40

Vertical groove length: 21 (cm)

Groove width: 0.1 (cm)

Groove depth: 0.1 (cm)

Gap between vertical grooves: 0.1 (cm)

Cross-sectional shape of groove: Square

TABLE I

| | Test example | | | | | |
|---|---|---|---|---|---|---|
| | 1-1 (Model 1) | 1-2 (Model 2) | 1-3 (Model 1) | 1-4 (Model 2) | 1-5 (Model 1) | 1-6 (Model 2) |
| Flow rate (ml/min/cm$^2$) | 75 | | 150 | | 300 | |
| Electrode | Anisotropic | Isotropic | Anisotropic | Isotropic | Anisotropic | Isotropic |
| X-direction flow velocity (m/s) | $8.8 \times 10^{-5}$ | $9.5 \times 10^{-5}$ | $1.8 \times 10^{-4}$ | $1.94 \times 10^{-4}$ | $3.7 \times 10^{-4}$ | $4.03 \times 10^{-4}$ |
| Y-direction flow velocity (m/s) | $1.7 \times 10^{-6}$ | $5.1 \times 10^{-5}$ | $0.37 \times 10^{-4}$ | $1.11 \times 10^{-4}$ | $0.86 \times 10^{-4}$ | $2.43 \times 10^{-4}$ |
| X-Y velocity ratio | 5.18 | 1.86 | 4.86 | 1.74 | 4.29 | 1.66 |

Referring to Table I, although the permeability of the anisotropic electrode in the X direction (permeability K1 in the direction A1) and the permeability K of the isotropic electrode are substantially equal to each other, for each of the flow rates, the X-Y velocity ratio in Model 1, in which the direction A1 is disposed so as to be parallel to the X direction serving as the main flow direction, is larger than that in Model 2, in which the isotropic electrode is used. Furthermore, in the cases where the flow rates are equal to each other, the flow velocity distributions in the main flow direction (X direction) are compared. For example, in Test example 1-2 (Model 2), a ratio of a region of vertical stripes having a low contrast, the region being formed so as to extend from the center of the electrode in the upward and downward directions, is high (refer to FIG. 9). This region is a region where the flow velocity is lower than a flow velocity suitable for the operation of the RF battery. When such a region is present in a large area, a region where the electrolyte flows at a flow velocity suitable for the operation of the RF battery is decreased, and thus the flow velocity has a large variation. When the flow velocity of the electrolyte flowing in the main flow direction varies, a battery reaction is not performed uniformly in the whole electrode, which may result in the increase in the internal resistance. On the other hand, in Test example 1-1 (Model 1), a region where the flow velocity is low is decreased, and a region of vertical stripes having a high contrast, the region extending from the top and the bottom of the electrode in directions toward the center is increased, as compared with Test example 1-2 (refer to FIGS. 8 and 9 with comparison). This region is a region where the flow velocity is suitable for the operation of the RF battery. These results show that, by disposing the direction A1 of the anisotropic electrode so as to be parallel to the main flow direction (X direction), the region of vertical stripes having a high contrast is increased to increase a region where the electrolyte flows at a flow velocity suitable for the operation of the RF battery.

Figure 9:
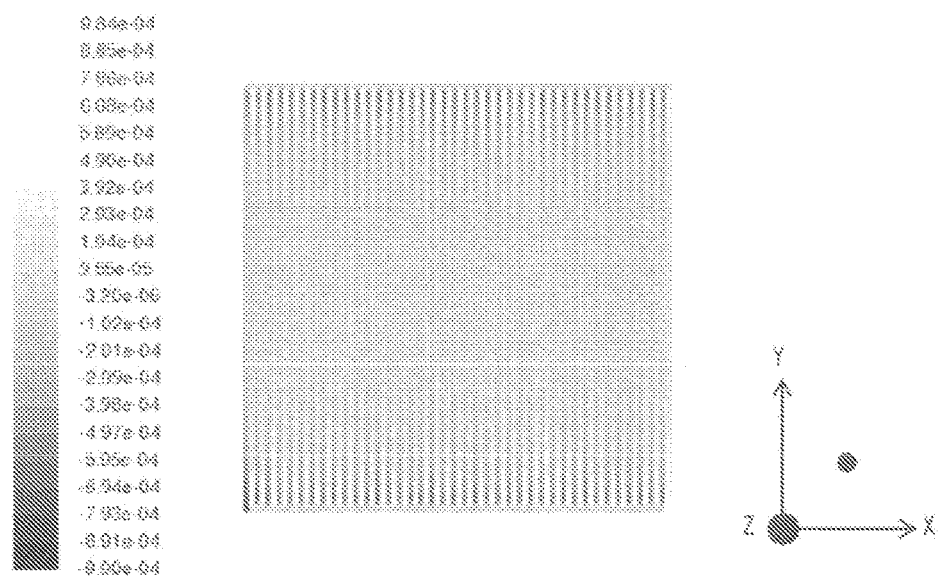
FIG. 9 is a schematic view showing a flow-velocity distribution in a main flow direction (X direction) in Test example 1-2.
Figure 10:
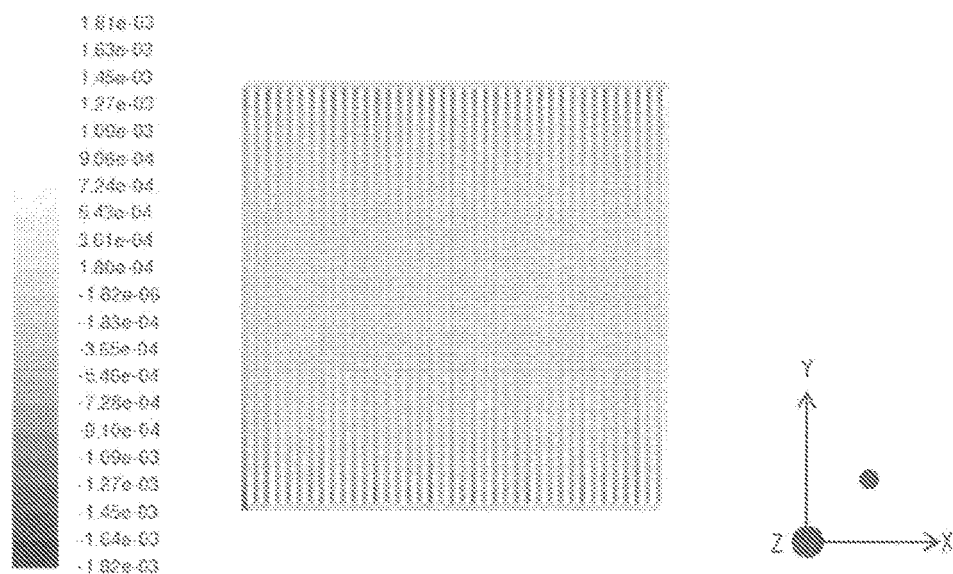
FIG. 10 is a schematic view showing a flow-velocity distribution in a main flow direction (X direction) in Test example 1-3.
Figure 11:
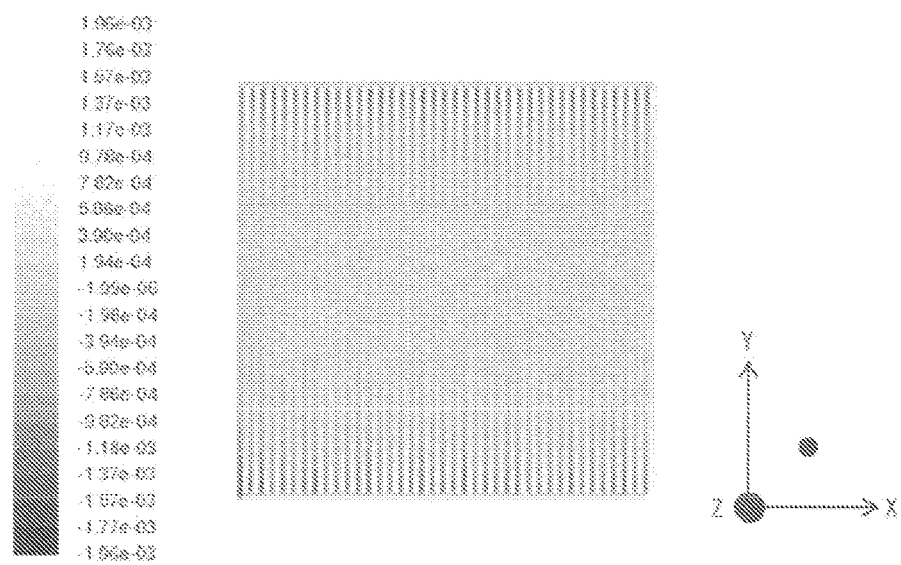
FIG. 11 is a schematic view showing a flow-velocity distribution in a main flow direction (X direction) in Test example 1-4.
Figure 12:
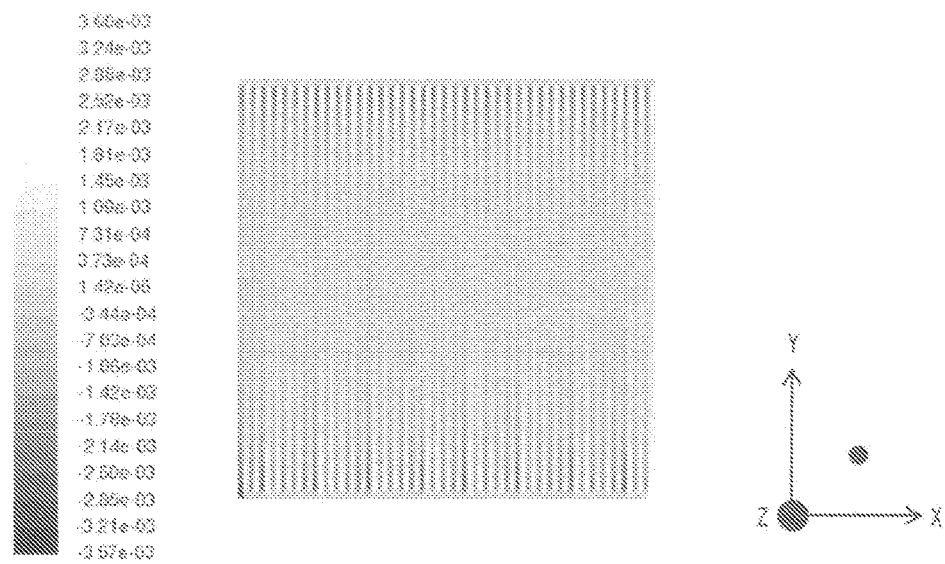
FIG. 12 is a schematic view showing a flow-velocity distribution in a main flow direction (X direction) in Test example 1-5.
Figure 13:
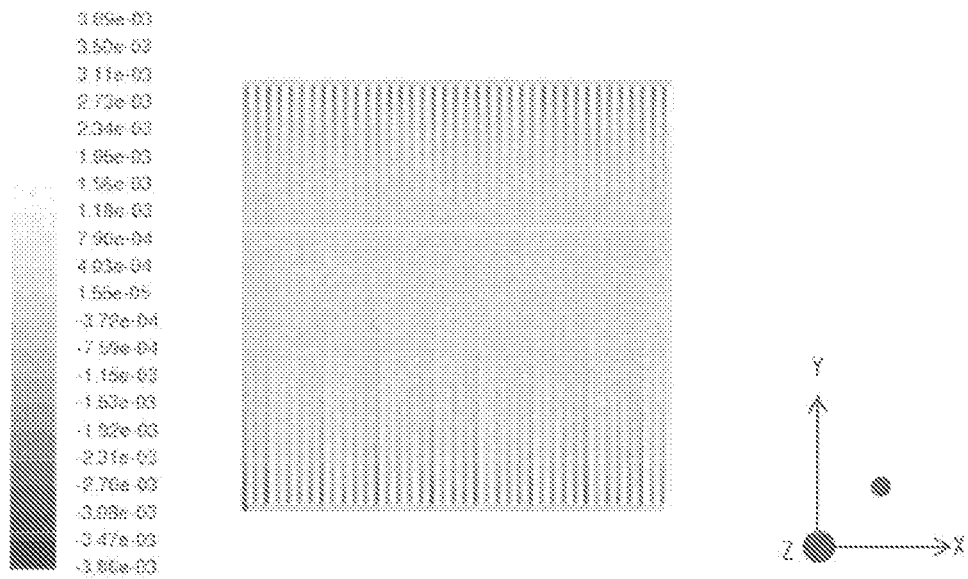
FIG. 13 is a schematic view showing a flow-velocity distribution in a main flow direction (X direction) in Test example 1-6.
Figure 14:
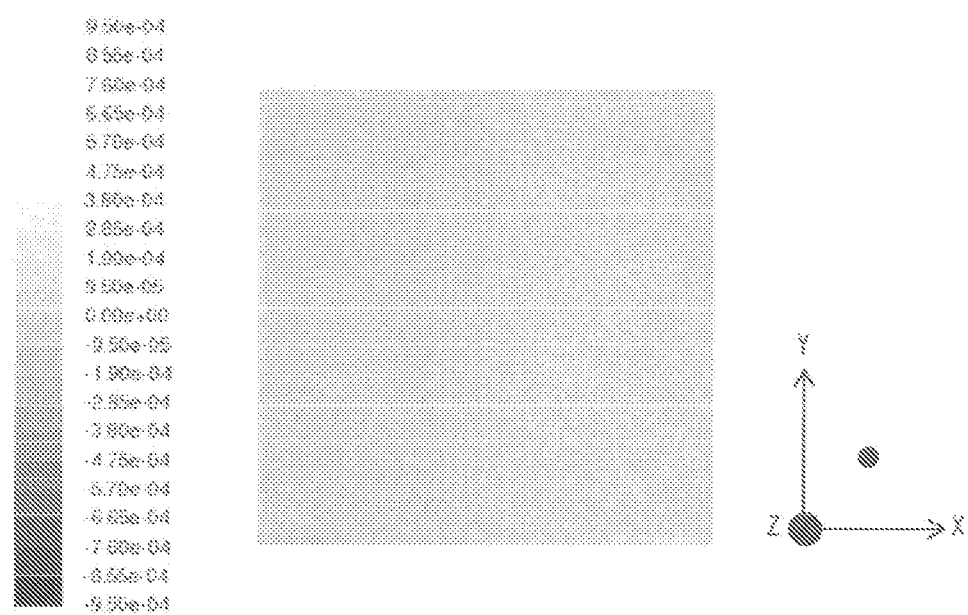
FIG. 14 is a schematic view showing a flow-velocity distribution in a main flow direction (X direction) in Test example 2-1.
Figure 15:
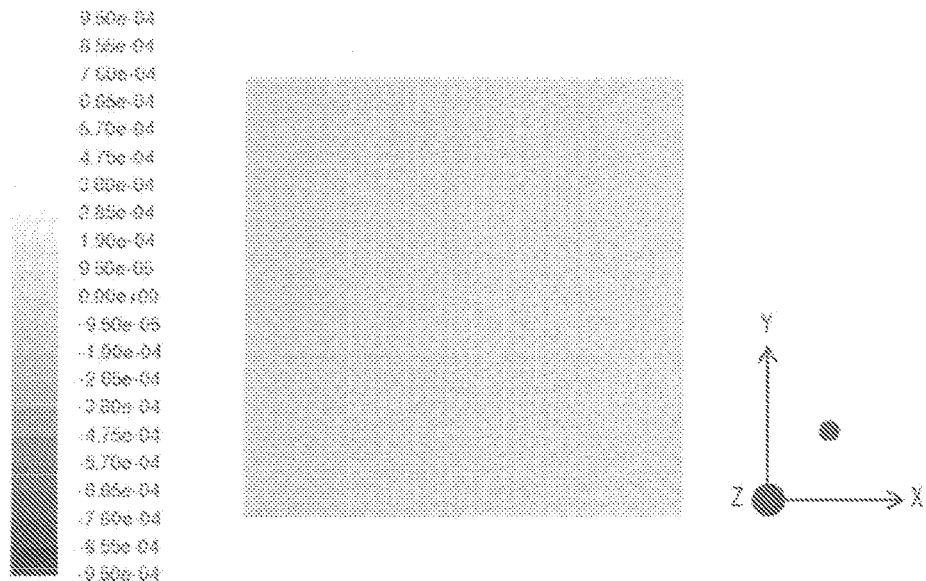
FIG. 15 is a schematic view showing a flow-velocity distribution in a main flow direction (X direction) in Test example 2-2.
Figure 16:
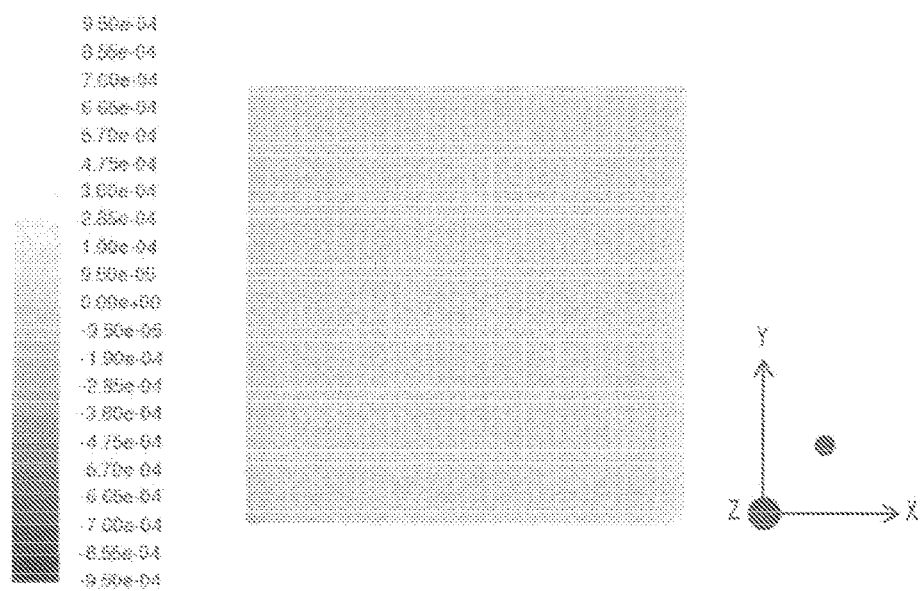
FIG. 16 is a schematic view showing a flow-velocity distribution in a main flow direction (X direction) in Test example 2-3.
Figure 17:
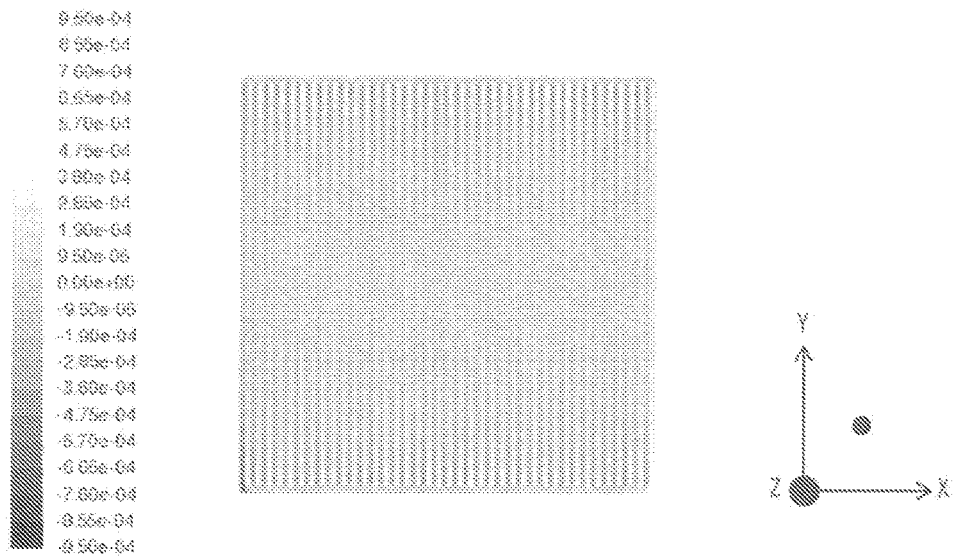
FIG. 17 is a schematic view showing a flow-velocity distribution in a main flow direction (X direction) in Test example 2-4.
Figure 18:
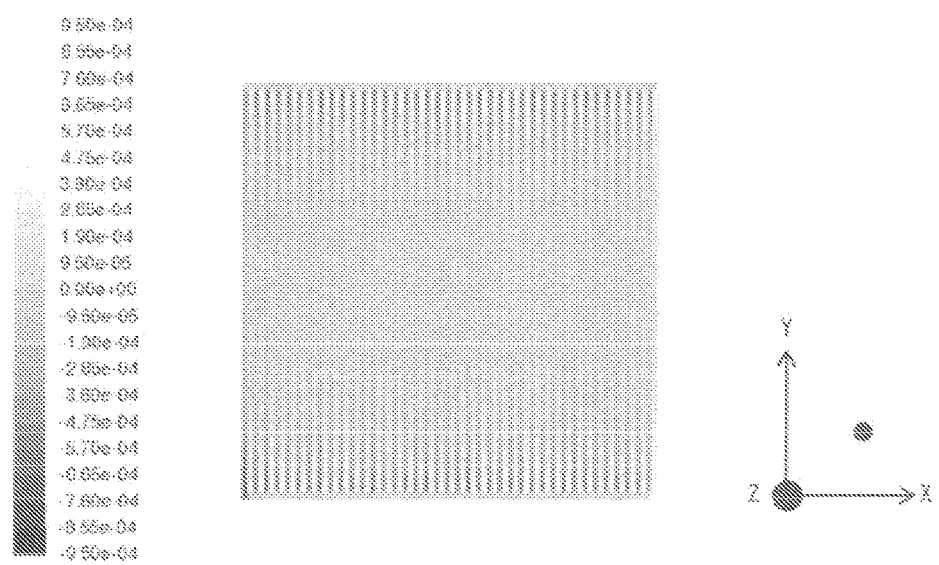
FIG. 18 is a schematic view showing a flow-velocity distribution in a main flow direction (X direction) in Test example 2-5.
Figure 19:
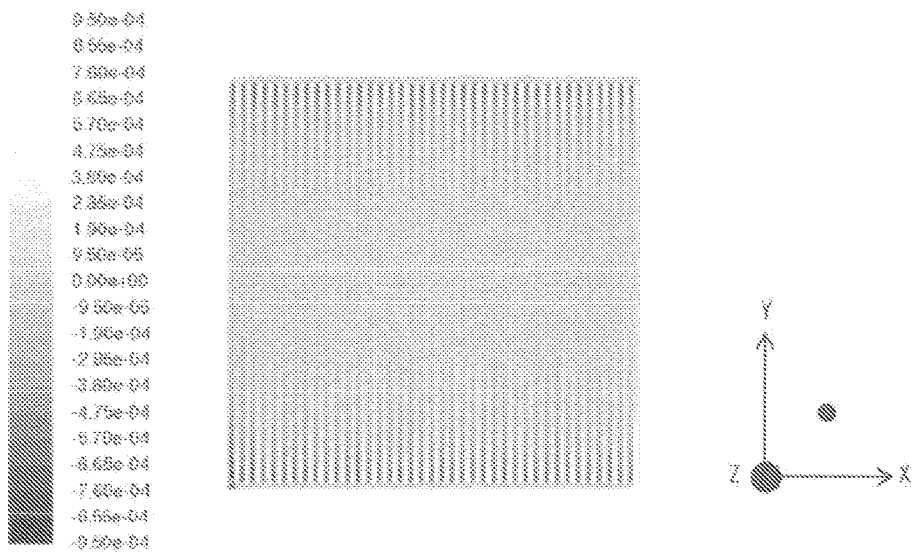
FIG. 19 is a schematic view showing a flow-velocity distribution in a main flow direction (X direction) in Test example 2-6.
Figure 20:
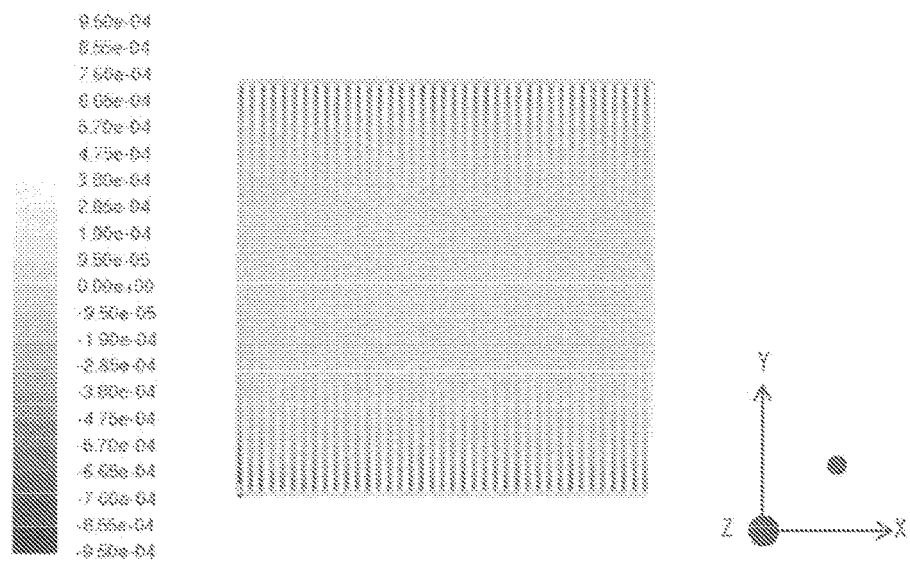
FIG. 20 is a schematic view showing a flow-velocity distribution in a main flow direction (X direction) in Test example 2-7.
Figure 21:
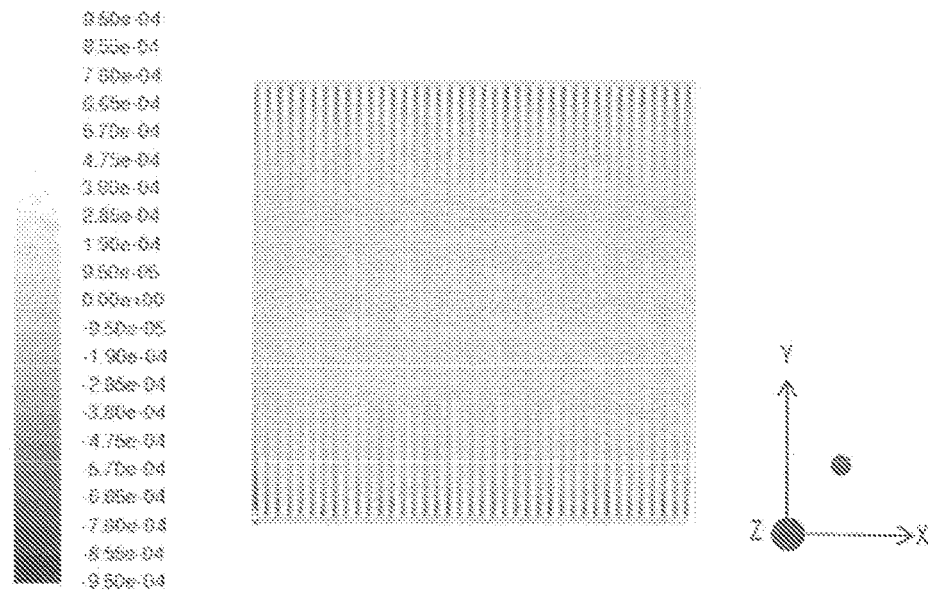
FIG. 21 is a schematic view showing a flow-velocity distribution in a main flow direction (X direction) in Test example 2-8.

Furthermore, in Test example 1-2, a portion in which a vertical stripe is disconnected is observed on the left end and the right end of the center of the electrode (refer to FIG. 9). It is believed that this is because an electrolyte that should flow in the right direction at the left end or in the left direction at the right end flows in the opposite directions, or is stagnant without flowing in the left direction or the right direction. That is, the flow of the electrolyte in the left and right directions is disordered, or a portion where the flow velocity is significantly low is generated. Accordingly, also from this viewpoint, it is believed that a variation in the flow velocity in the electrode is generated. On the other hand, in Test example 1-1, such a portion is not observed (refer to FIG. 8). These also apply to the cases where the flow velocity was changed (compare Test example 1-4 (FIG. 11) with Test example 1-3 (FIG. 10) and compare Test example 1-6 (FIG. 13) with example 1-5 (FIG. 12)).

As described above, when the direction A1 of the anisotropic electrode is disposed so as to be parallel to the main flow direction (X direction), it is easy to increase a region where the electrolyte flows at a flow velocity suitable for the operation of the RF battery and to decrease a portion where the electrolyte flowing in the main flow direction is stagnant in the electrode. It is believed that, consequently, the variation in the flow velocity is decreased and the internal resistance is reduced.

Test Example 2

In Test example 2, the correspondence relationship between the main flow direction and an anisotropic electrode was examined. First, Model 3 in which the structure of the electrode and the flow rate of the electrolyte were different from those in Model 1 of Test example 1 was formed.

The X-direction flow velocity, the Y-direction flow velocity, and the X-Y velocity ratio were examined when a permeability Kx in a direction parallel to the main flow direction (X direction) of the electrolyte was a constant value, and a permeability Ky in a direction orthogonal to the main flow direction on the plane of the electrode was changed to various values. Test example 2-1 to Test example 2-5 correspond to cases where the direction A1 of an anisotropic electrode is disposed so as to be parallel to the X direction, which is the main flow direction. Test example 2-6 corresponds to a case where an isotropic electrode is used. Test example 2-7 and Test example 2-8 correspond to cases where the direction A1 of an anisotropic electrode is disposed so as to be orthogonal to the X direction, which is the main flow direction. Conditions different from those in Test example 1 are described below. Table II shows the test results. FIGS. 14 to 21 show the distribution of the flow velocity in the X direction in the respective test examples. The X-Y velocity ratio and the chart shown in each of the drawings represent the same as those in Test example 1.

(Electrolyte Flow Rate, Etc.)
Inlet flow rate: 0.3 (ml/min/cm$^2$)

TABLE II

| Test example | Kx | Ky | Kx/Ky | X-Y velocity ratio |
|---|---|---|---|---|
| 2-1 | $7.56 \times 10^{-11}$ | $7.56 \times 10^{-15}$ | 10000 | 58 |
| 2-2 | | $7.56 \times 10^{-14}$ | 1000 | 47 |
| 2-3 | | $7.56 \times 10^{-13}$ | 100 | 39 |
| 2-4 | | $0.84 \times 10^{-11}$ | 9.0 | 19.5 |
| 2-5 | | $2.52 \times 10^{-11}$ | 3.0 | 4.6 |
| 2-6 | | $7.56 \times 10^{-11}$ | 1.0 | 1.8 |

TABLE II-continued

| Test example | Kx | Ky | Kx/Ky | X-Y velocity ratio |
|---|---|---|---|---|
| 2-7 | | $22.7 \times 10^{-11}$ | 0.33 | 0.51 |
| 2-8 | | $68.0 \times 10^{-11}$ | 0.11 | 0.27 |

Table II shows that the X-Y velocity ratio in each of Test example 2-1 to Test example 2-5 that correspond to cases where the direction A1 of an anisotropic electrode is disposed so as to be parallel to the X direction, which is the main flow direction, is larger than the X-Y velocity ratio in each of Test example 2-6 that corresponds to a case where an isotropic electrode is used and Test example 2-7 and Test example 2-8 that correspond to cases where the direction A1 of an anisotropic electrode is disposed so as to be orthogonal to the X direction, which is the main flow direction. In particular, the results of Test example 2-7 and Test example 2-8 show that when the direction in which the anisotropic electrode has a high permeability is arranged so as to be orthogonal to the main flow direction (X direction), the flow velocity in the X direction, which is the main flow direction, is lower than the flow velocity in the Y direction. The result of Test example 2-5 shows that when the direction A1 of the anisotropic electrode is disposed so as to be parallel to the X direction, which is the main flow direction, and the ratio Kx/Ky (in this test, corresponding to K1/K2) is 3.0 or more, the X-Y velocity ratio can be made to be 4.6 or more. Similarly, the result of Test example 2-4 shows that when the ratio Kx/Ky (K1/K2) is 9.0 or more, the X-Y velocity ratio increases to about 20. The result of Test example 2-3 shows that when the ratio Kx/Ky (K1/K2) is 100 or more, the X-Y velocity ratio increases to about 40. The result of Test example 2-2 shows that when the ratio Kx/Ky (K1/K2) is 1,000 or more, the X-Y velocity ratio increases to about 50. The result of Test example 2-1 shows that when the ratio Kx/Ky (K1/K2) is 10,000 or more, the X-Y velocity ratio increases to about 60.

Comparing FIGS. 17 to 21 to each other, it is found that, with the increase in the permeability Kx in the main flow direction (X direction) relative to the permeability Ky in the direction orthogonal to the main flow direction, a region of a flow velocity suitable for the operation of the RF battery (region of vertical stripes having a high contrast) increases. Thus, the results show that, at least until the ratio Kx/Ky becomes about 10, with the increase in the ratio Kx/Ky, the region of vertical stripes having a high contrast increases, and the ratio of the region where the electrolyte flows at a flow velocity suitable for the operation of the RF battery increases.

In Test example 2-1 (FIG. 14) in which the ratio Kx/Ky (K1/K2) is 10,000 and Test example 2-2 (FIG. 15) in which the ratio Kx/Ky (K1/K2) is 1,000, a region of vertical stripes is not observed on the left and the right of the electrode. This is because the flow velocity of the electrolyte present in this region is substantially a flow velocity at which the electrolyte is considered to be stagnant in the electrode. In other words, since the flow velocity is close to zero, the shading does not show vertical stripes having a high contrast from the viewpoint of the configuration of the chart used in each of the drawings. As described above, when a region where the electrolyte flows at a flow velocity suitable for the operation of the RF battery and a region where the electrolyte is stagnant are present, a variation in the battery reaction tends to be generated. As a result, the variation may become a cause of the increase in the internal resistance of the RF battery. Thus, when the permeability Kx in the main flow direction (X direction) is excessively larger than the permeability Ky in the direction orthogonal to the main flow direction, the internal resistance of the RF battery may increase. On the other hand, it is found that, in Test example 2-3 in which the ratio Kx/Ky (K1/K2) is 100, a region where the electrolyte flowing in the main flow direction is stagnant in the electrode is significantly reduced compared with Test example 2-1 and Test example 2-2 (refer to FIG. 16).

Accordingly, when the ratio Kx/Ky is 1.5 or more and 100 or less, that is, when K1 is 1.5 times K2 or more and 100 times K2 or less, the ratio of the region where the electrolyte flows in the X direction at a flow velocity suitable for the operation of the RF battery is increased, and the region where the electrolyte flowing in the main flow direction is stagnant in the electrode is decreased. Thus, it is expected that the internal resistance is reduced.

Test Example 3

In Test example 3, a charge-discharge test was performed using a small-size RF battery having a single-cell structure, and the internal resistance was examined. This small-size RF battery also includes a bipolar plate including the interdigitated, facing comb-teeth-shaped flow channel illustrated in FIG. 2. Electrodes having the same structure were used as a positive electrode and a negative electrode. An electrolyte is introduced from a lower portion of the bipolar plate and discharged from an upper portion of the bipolar plate as in Embodiment 1. Consequently, the top-bottom direction was defined as a height (Y direction), the left-right direction was defined as a width (X direction), and a direction orthogonal to the X direction and the Y direction was defined as a thickness (Z direction). The internal resistances were measured in a case where the direction A1 of an anisotropic electrode was disposed so as to be parallel to the X direction, which was the main flow direction (Test example 3-1) and a case where the direction A1 of an anisotropic electrode was disposed so as to be orthogonal to the X direction, which was the main flow direction (Test example 3-2). In this test example, since the RF battery has a single-cell structure as described above, the meaning of the internal resistance of the battery is the same as that of an area specific resistance. Therefore, the internal resistance is represented as an area specific resistance. Detailed test conditions are described below. Table III shows the results. The area specific resistance in Table III represents the average of area specific resistances in the second cycle and the third cycle, the resistances being determined by the method for calculating an area specific resistance described below.

(Test Conditions)

<<Electrode>>

Type: Carbon electrode (manufactured by SGL Carbon Japan Co., Ltd., GDL10AA)

Height: 3.1 (cm), Width: 2.9 (cm), Thickness: 0.02 (cm)

<<Electrolyte>>

Sulfuric acid V aqueous solution (V concentration: 1.7 mol/L, sulfuric acid concentration: 3.4 mol/L)

State of charge: 50%

<<Electrolyte Flow Rate, Etc.>>

Inlet flow rate: 0.31 (ml/min/cm$^2$)

Outlet flow rate: Free discharge

<<Bipolar Plate>>

Height (Y direction): 3.1 (cm), Width (X direction): 2.9 (cm)

[Flow Channel]

Groove shape: Interdigitated, facing comb-teeth shape

Number of vertical grooves: Inlet channel 8×Outlet channel 7

Vertical groove length: 2.6 (cm)

Groove width: 0.1 (cm)

Groove depth: 0.1 (cm)

Gap between vertical grooves: 0.1 (cm)
Cross-sectional shape of groove: Square
<<Charge-Discharge Conditions>>
Charge-discharge method: Constant current
Current density: 70 (mA/cm$^2$)
End-of-charge voltage: 1.55 (V)
End-of-discharge voltage: 1.00 (V)
Temperature: 25° C.
<<Area Specific Resistance (Internal Resistance)>>
Calculation method: R=(V2−V1)/2I
R: Area specific resistance (Ω·cm$^2$)
I: Current density (A/cm$^2$)
V1: Voltage (V) in middle point of charging time
V2: Voltage (V) in middle point of discharging time

TABLE III

| Test Example | K1 | K2 | K1/K2 | Area specific resistance (Ω · cm$^2$) |
| --- | --- | --- | --- | --- |
| 3-1 | 7.56 × 10$^{-11}$ | 1.95 × 10$^{-11}$ | 3.87 | 1.14 |
| 3-2 | 1.95 × 10$^{-11}$ | 7.56 × 10$^{-11}$ | 0.258 | 1.34 |

As shown in Table III, the internal resistance of Test example 3-1 in which the direction A1 of the anisotropic electrode is disposed so as to be parallel to the X direction, which is the main flow direction, is lower than that of Test example 3-2 in which the direction A1 is disposed so as to be orthogonal the main flow direction (X direction). It is believed that this is because, in Test example 3-1, the direction A1 of the anisotropic electrode and the main flow direction (X direction) are disposed so as to be parallel to each other, and thus the variation in the flow velocity of the electrolyte flowing in the main flow direction in the electrode is reduced, as described in Test example 1 and Test example 2.

(Method for Measuring Permeability)

Figure 22:
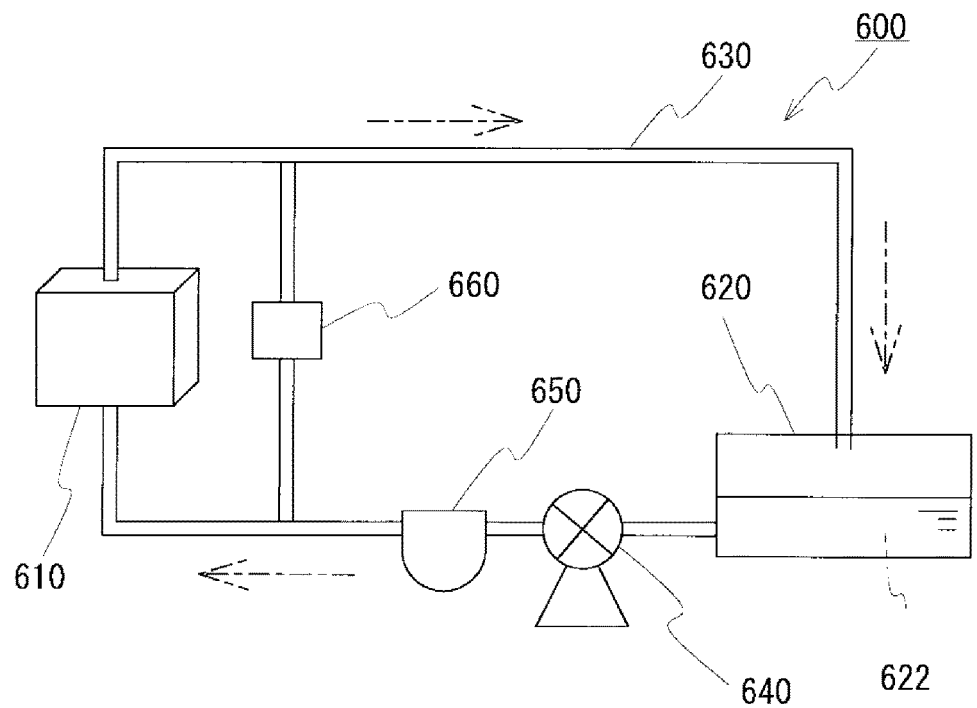
FIG. 22 is a schematic structural view of a pressure-loss measurement system used in the measurement of permeability.

The permeability of the anisotropic electrode used in Test example 3 was determined as follows. A pressure loss ΔP and a flow rate Q of a fluid were measured by using a pressure-loss measurement system 600 illustrated in FIG. 22. The permeability was determined using the measurement results and an equation represented by ΔP=(h/K)μ(Q/wd) (referred to as Darcy-Weisbach Equation, details of which will be described later). The pressure-loss measurement system 600 includes a measurement cell 610, a fluid tank 620, a pump 640, a flow meter 650, a differential pressure gauge 660, and a pipe 630 that connects these devices to each other. The measurement cell 610 contains therein an electrode (electrode layer) whose permeability K is to be determined. The fluid tank 620 stores a fluid 622 (such as water) to be introduced into the electrode. The pump 640 feeds the fluid 622 to the devices under pressure through the pipe 630. The flow meter 650 measures a flow rate of the fluid on the outlet side of the pump. The differential pressure gauge 660 is connected to the measurement cell 610 in parallel through the pipe 630 and measures a pressure loss ΔP. The measurement cell 610 includes a storage portion (not shown) that stores an electrode. A spacer (not shown) for ensuring an electrode thickness d of 0.2 to 0.5 mm is disposed in the storage portion. The flow meter 650 and the differential pressure gauge 660 are attached to the pipe 630. The one-dotted chain line arrows in FIG. 22 show directions in which the fluid 622 is allowed to flow.

An electrode having a height h of 100 mm and a width d of 50 mm is pushed into the storage portion of the measurement cell 610. The fluid 622 (in this example, water whose viscosity μ is assumed to be a constant) is then allowed to flow in the measurement cell 610 that holds an electrode layer by using the pump 640. The fluid 622 is introduced from a side surface (surface having a cross-sectional area represented by wd) of the electrode layer and is allowed to flow in the height direction of the electrode layer. In this case, the pressure losses ΔP when the flow rate Q is changed to various values by adjusting the pump 640 are each measured with the differential pressure gauge 660. The results are plotted in a graph where the horizontal axis represents the flow rate Q and the vertical axis represents the pressure loss ΔP. These plotted measurement points are approximated by the Darcy-Weisbach Equation. The slope of the approximate straight line is defined as the permeability K in the height direction.

In the Darcy-Weisbach Equation, K represents a permeability (m$^2$), ΔP represents a pressure loss (Pa), Q represents a flow rate (m$^3$/s) of a fluid to be introduced in an electrode, μ represents a viscosity (Pa·s) of the fluid to be allowed to flow, h represents a height (m) of the electrode, w represents a width (m) of the electrode α, and d represents a thickness (m) of the electrode in a state of being compressed in a cell stack 200. The permeability K is a value inherent to the electrode layer regardless of the type of fluid. Therefore, as described above, the permeability K is a constant that can be measured by using a fluid, such as water, whose viscosity is known.

INDUSTRIAL APPLICABILITY

The redox flow batteries according to the present invention can be suitably used as large-capacity storage batteries for natural-energy power generation, such as solar power generation or wind power generation, for the purpose of stabilizing variation of power output, storing generated power during oversupply, leveling load, and the like. The redox flow batteries according to the present invention also can be additionally provided in a general power plant, large-scale commercial facilities, or the like and suitably used as large-capacity storage batteries as countermeasures against instantaneous voltage drop/power failure and for the purpose of leveling load.

| Reference Signs List | | |
| --- | --- | --- |
| 1 redox flow battery (RF battery) | | |
| 100 battery cell | | |
| 101 membrane | 102 positive electrode cell | 103 negative electrode cell |
| 104 positive electrode | 105 negative electrode | |
| 106 positive electrode electrolyte tank | 107 negative electrode electrolyte tank | |
| 108, 109, 110, 111 duct | | |
| 112, 113 pump | | |
| 200 cell stack | | |
| 120 cell frame | | |
| 121 bipolar plate | | |
| 130 flow channel | | |
| 131 inlet channel | 132 outlet channel | |
| 130a, 131a, 132a horizontal groove (groove portion) | | |
| 130b, 131b, 132b vertical groove (groove portion) | | |
| 135a short groove portion | 135b long groove portion | |
| 122 frame | | |
| 123, 124 inlet port (liquid supply manifold) | | |
| 125, 126 outlet port (liquid discharge manifold) | | |

-continued

| Reference Signs List | | |
|---|---|---|
| α anisotropic electrode | | |
| α1 anisotropic electrode layer | | |
| 300 AC/DC converter | 310 transformer facilities | |
| 400 power generation unit | 500 load | |
| 600 pressure-loss measurement system | | |
| 610 measurement cell | 620 fluid tank | 622 fluid |
| 630 pipe | 640 pump | |
| 650 flow meter | 660 differential pressure gauge | |

The invention claimed is:

1. A redox flow battery comprising a membrane; a bipolar plate; an electrode disposed between the membrane and the bipolar plate; an inlet port for supplying an electrolyte to the electrode; and an outlet port for discharging the electrolyte from the electrode, the redox flow battery performing a charge-discharge reaction by allowing the electrolyte to flow in the electrode, wherein the electrode includes an anisotropic electrode layer having different permeabilities between a direction A1 on a plane of the electrode and a direction A2 orthogonal to the direction A1 on the plane of the electrode, in the anisotropic electrode layer, a permeability K1 in the direction A1 is larger than a permeability K2 in the direction A2, and the electrode is disposed such that the direction A1 is substantially parallel to a main flow direction of the electrolyte in the electrode, the main flow direction being determined on the basis of a positional relationship between the inlet port and the outlet port and a shape of a surface of the bipolar plate on the electrode side.

2. The redox flow battery according to claim 1, wherein the permeability K1 is 1.5 times or more and 100 times or less the permeability K2.

3. The redox flow battery according to claim 1, wherein the bipolar plate includes a flow channel which is disposed on the surface on the electrode side and in which the electrolyte flows, the flow channel has a plurality of groove portions disposed parallel to each other, and the main flow direction is a direction in which the groove portions are disposed in parallel.

4. The redox flow battery according to claim 3, wherein the flow channel includes an inlet channel connected to the inlet port and an outlet channel connected to the outlet port, the inlet channel and the outlet channel each include the groove portions, and the inlet channel and the outlet channel do not communicate with each other and are independent of each other.

5. The redox flow battery according to claim 4, wherein the inlet channel and the outlet channel each include groove portions having a comb-teeth shape, and the inlet channel and the outlet channel are disposed such that comb teeth face each other in an interdigitated manner.

6. The redox flow battery according to claim 3, wherein the flow channel has a continuous meandering shape extending from the inlet port to the outlet port and includes a plurality of long groove portions disposed in parallel so as to be adjacent to each other, and a plurality of short groove portions that alternately connect one ends or the other ends of the long groove portions to each other, and the main flow direction is a direction in which the long groove portions are disposed in parallel.

7. The redox flow battery according to claim 1, wherein the shape of the surface of the bipolar plate on the electrode side is a flat surface shape, and the main flow direction is directed from the inlet port side to the outlet port side.

* * * * *